United States Patent [19]

LeBlanc et al.

[11] Patent Number: 5,508,707
[45] Date of Patent: Apr. 16, 1996

[54] METHOD FOR DETERMINING POSITION BY OBTAINING DIRECTIONAL INFORMATION FROM SPATIAL DIVISION MULTIPLE ACCESS (SDMA)-EQUIPPED AND NON-SDMA-EQUIPPED BASE STATIONS

[75] Inventors: Frederick W. LeBlanc, Arvada; Alparslan M. Uysal, Boulder, both of Colo.

[73] Assignee: U S WEST Technologies, Inc., Boulder, Colo.

[21] Appl. No.: 314,486

[22] Filed: Sep. 28, 1994

[51] Int. Cl.$^6$ ............ G01S 3/02; H04M 11/00; H04Q 7/00; H04B 1/00
[52] U.S. Cl. ............ 342/457; 379/59; 455/33.4; 455/56.1
[58] Field of Search ............ 342/457, 357; 379/59, 60; 455/33.1, 33.4, 56.1

[56] References Cited

U.S. PATENT DOCUMENTS

| | | | |
|---|---|---|---|
| 2,479,531 | 8/1949 | Webber | 342/450 |
| 3,889,264 | 6/1975 | Fletcher . | |
| 3,922,677 | 11/1975 | Tomkewitsch et al. | 342/457 |
| 4,054,880 | 10/1977 | Dalabakis et al. . | |
| 4,799,062 | 1/1989 | Sanderford, Jr. et al. . | |
| 4,833,480 | 5/1989 | Palmer et al. . | |
| 4,876,738 | 10/1989 | Selby . | |
| 4,888,595 | 12/1989 | Friedman . | |
| 4,891,650 | 1/1990 | Sheffer . | |
| 5,043,736 | 8/1991 | Darnell et al. . | |
| 5,055,851 | 10/1991 | Sheffer . | |
| 5,097,499 | 3/1992 | Cosentino . | |
| 5,103,459 | 4/1992 | Gilhousen et al. . | |
| 5,173,710 | 12/1992 | Kelley et al. . | |
| 5,179,721 | 1/1993 | Comroe et al. . | |
| 5,208,756 | 5/1993 | Song . | |
| 5,216,429 | 6/1993 | Nakagawa et al. . | |
| 5,218,367 | 6/1993 | Sheffer et al. . | |
| 5,218,629 | 6/1993 | Dumond, Jr. et al. . | |
| 5,221,925 | 6/1993 | Cross . | |
| 5,223,844 | 6/1993 | Mansell et al. . | |
| 5,230,081 | 7/1993 | Yamada et al. | 455/33.1 |
| 5,280,295 | 1/1994 | Kelley et al. . | |
| 5,293,642 | 3/1994 | Lo | 455/33.1 |

Primary Examiner—Gregory C. Issing
Attorney, Agent, or Firm—Brooks & Kushman

[57] ABSTRACT

A method for determining position by obtaining directional information from spatial division multiple access (SDMA)-equipped and non-SDMA-equipped base stations. The method is directed for use in a wireless communication system which includes a plurality of base stations each having a corresponding coverage area. For each of the base stations, a plurality of RF measurements are determined in cooperation with a receiver, including a link budget of the base station, for a predetermined plurality of distances and directions. Determined RF measurements for each of the base stations are modeled as a scaled contour shape having minimum and maximum boundaries. Base stations which neighbor the mobile unit are determined so as to define a first bounding polygon area by their intersecting contours. The first bounding polygon area generally describes the relative position of the mobile unit. A second bounding polygon area is determined in accordance with the lobes of neighboring base stations as described in terms of azimuth angles. The intersection of the first and second bounding polygon areas are determined so as to define a location polygon which more precisely describes the position of the mobile unit in terms of minimum and maximum error estimate.

3 Claims, 20 Drawing Sheets

FREQUENCY DIFFERENTIATING
CIRCUITRY FILTERS

METHOD FOR DETERMINING POSITION BY OBTAINING DIRECTIONAL INFORMATION FROM SPATIAL DIVISION MULTIPLE ACCESS (SDMA)-EQUIPPED AND NON-SDMA-EQUIPPED BASE STATIONS

TECHNICAL FIELD

The present invention relates generally to positioning methods. More particularly, the invention relates to a method for determining the position of a mobile unit in a wireless communication system or public land mobile telecommunication system, including a plurality of Spatial Division Multiple Access (SDMA)-equipped and non-SDMA-equipped base stations.

BACKGROUND ART

Most metropolitan areas are now equipped with one or more forms of wireless communication networks which provide mobile telephone and other related services to customers across a broad frequency spectrum. Consider, for example, what has come to be known as "cellular" telephone services or Personal Communication Services "PCS", i.e., radio transmissions in the frequency band between approximately 800 MHz and 2.2 GHz.

Public wireless communications services are removing the historical mobility constraints on the users of public communications systems. Continuing improvements in the capabilities and services offered by these systems will be accompanied by increasingly broad public acceptance and adoption. Relaxing the mobility constraints on communications systems users is thus generally considered desirable. For service providers who rely on precise location information, however, such as for example, Emergency "911" (E-911) service providers, this increased user mobility is a definite disadvantage. Uncertainty concerning the user's location translates directly into increased response times and therefore a reduced quality of service when the caller is uncertain of, or cannot describe, her location.

In wired commercial communications systems, precise information concerning the location of the user's equipment, and hence that of the user, is available. Wireless systems, on the other hand, typically follow a cellular model in which there are wired connections to base stations and then wireless links from each base station to its active users. The service area for each base station is roughly circular in shape with a radius of 5–20 km and overlaps that of its neighboring base stations. This corresponds to a base station service area in the range of roughly 80–1300 km². In some systems, the coverage area for each physical base station is further divided into equiangular sectors, each operating as an independent cell. Three 120 degree sectors is representative of this type of design, and the corresponding sector service areas become 26–420 km². Although the serving base station (and sector) of a wireless E-911 caller, for example, are known, the corresponding location information is clearly too coarse for timely E-911 response. FIG. 1 of the drawings depicts this described situation for conventional omnidirectional or sector base stations.

As shown in FIG. 2, prior art cellular telephone systems 10 include a mobile telephone switching center (MSC) 12 and a plurality of base stations such as cell site transceivers 14a–14c. The cell site transceivers transmit radio signals to and receive radio signals from one or more mobile units 16 that move about a cellular service area 20. A mobile unit, as the term is used herein, refers to a wireless voice telephone or data receiver that can be permanently installed at a fixed location or within a vehicle or that can be portable. Each cell site transceiver 14 is able to broadcast and receive the radio signals within a geographic area 18 called the cell site coverage area. Together, the areas 18 comprise the entire cellular service area 20. Typically, a cellular service area comprises a metropolitan area or larger region.

When a telephone call to a called mobile unit 16 originates from either another mobile unit or a land-based telephone via a Public Switched Telephone Network (PSTN) 22, a caller must first access the cellular telephone system 10. This task is accomplished by dialing the mobile unit's unique identification number (i.e., its phone number). The MSC 12 receives the call request and instructs the central call processor 24 to begin call processing. The central call processor 24 transmits a signal over a dedicated line 26 (such as a telephone line or microwave link, etc. (to each of the cell site transceivers 14a–14c causing the cell site transceivers to transmit a page signal that the mobile unit 16 receives. The page signal alerts a particular mobile unit 16 that it is being called by including as part of the page signal the paged mobile unit's identification or phone number.

Each cell site transceiver 14 transmits the page signal on one or more dedicated forward control channels that carry all pages, as well as control signals, channel assignments, and other overhead messages to each mobile unit. The forward control channel is distinct from the voice channel but actually carries voice communications between a mobile and another mobile unit or a land-based telephone. Each cell site transceiver may have more than one forward control channel upon which pages can be carried.

When a mobile unit is not engaged in a telephone call, it operates in an idle state. In the idle state, the mobile unit will tune to the strongest available forward control channel and monitor the channel for a page signal or other messages directed to it. Upon determining that a page signal is being transmitted, the mobile unit 16 again scans all forward control channels so as to select the cell site transceiver transmitting the strongest Signal. The mobile unit then transmits an acknowledgement signal to the cell site transceiver over a reverse control channel associated with the strongest forward control channel. This acknowledgement signal serves to indicate to the MSC 12 which of the forward control channels (associated with the several cell site transceivers 14a–14c) to use for further call processing communications with mobile unit 16. This further communication typically includes a message sent to the mobile unit instructing it to tune to a particular voice channel for completion of call processing and for connection with the calling party.

The details of how the cell site transceivers transmit the signals on the forward and reverse control channels are typically governed by standard protocols such as the EIA/TIA-553 specification and the air interface standards for Narrowband Analog Mobile Phone Service (NAMPS) IF-88 and IS-95 air interface standards for digital communications, all of which are well known to those of ordinary skill in the wireless telephone communications art and therefore will not be discussed.

While cellular networks have been found to be of great value to mobile users whose travels span many miles, they have also been found to be prohibitively expensive to implement for small scale applications wherein system subscribers only desire wireless telephone services in limited geographic areas, such as, for example, within office buildings or in campus environments.

The Personal Communications Network (PCN) is a relatively new concept in mobile communications developed specifically to serve the aforementioned applications. Similar to cellular telephony goals, a Personal Communications Network goal is to have a wireless communication system which relates telephone numbers to persons rather than fixed locations. Unlike cellular telephones, however, the PCN telephones are directed to small geographic areas thus defining "microcellular" areas designed to operate in similar fashion to large scale cellular telephone networks. PCN technologies are also similar to residential cordless telephones in that they utilize base stations and wireless handsets. Unlike the former, however, PCN technology utilizes advanced digital communications architecture, such as, for example, PACS, formerly called WACS, (Bellcore), DECT (European), CDMA (Omnipoint), PHS-PHP (Japan), IS-54 (TDMA), IS-95 (CDMA), PCS-1900 (GSM), and B-CDMA (Oki), and features which may be implemented either as private networks or regulated services. When offered by communications carriers as services, this PCN capability is generally referred to as Personal Communications Services (PCS), and may be situated in a wide variety of environments, including, for example, outdoor urban, suburban, rural, indoor single-level and indoor multi-level areas.

As shown in FIG. 3, prior art PCS systems 28 include one or more control units 30 which, in accordance with the American National Standards Institute (ANSI) T1P1 working document for stage 2 service description, as known to those skilled in the art, are termed Radio Access System Controllers (RASCs), access managers, etc. These control units 30 operate in similar fashion to the MTSC 12 of the cellular telephone network and, therefore, are provided in electrical communication with the Public Switched Telephone Network 22. A plurality of base stations or Radio Ports (RPs) 32 are also provided which transmit radio signals to and receive radio signals from one or more subscriber wireless telephones 16, termed mobile units or Radio Personal Terminals (RPTs) that move about a PCS service area 34. Each Radio Port 32, like cell site transceivers 14, is able to broadcast and receive radio signals within a geographic area 36 called the Radio Port coverage area. Together, the areas 36 comprise the entire PCS service area 34.

A generalized reference architecture for the PCS system of FIG. 3 is shown in further detail in FIGS. 4a–4b. The reference architecture includes reference elements which support radio access, wireline access, switching and control, mobility management, and Operations, Administration, Maintenance and Purchasing (OAM&P). As shown in the schematic, the PCS system includes a PCS Switching Center (PSC) 38 which supports access independent call/service control and connection control (switching) functions and is responsible for interconnection of access and network systems to support end-to-end services. The PCS switching center 38 represents a collection of one or more network elements. The system further includes a Radio Access System Controller (RASC) 40 which supports the wireless mobility management and wireless access call control functions. It serves one or more subtending Radio Port Controllers (RPCs) 42 and may be associated with one or more PCS switching centers 38. As known to those skilled in the art, Radio Port Controllers 42 provide an interface between one or more subtending Radio Port Intermediaries (RPIs), a PCS switching center such as 38, and RASC, air interface independent radio frequency transmission and reception functions.

The system further includes a Radio Port Intermediary (RPI) 44 which provides an interface between one or more subtending Radio Ports 46 and the Radio Port Controller 42, and supports air interface dependent radio frequency transmission and reception functions. Radio Port 46 supports the transmission of signals over the air interface and is provided in communication with Radio Personal Terminal (RPT) 48. This is a light-weight, pocket-size portable radio terminal providing the capability for the user to be either stationary or in motion while accessing and using telecommunication services.

The system further includes variations of RPTs which are in fixed locations, termed Radio Termination Type 1 (50) and Radio Termination Type 2 (52), which interface Terminal Equipment Type 1 (54) and Terminal Equipment Type 2 (56) to the Radio Access Interface.

The system of FIG. 4 further includes a Terminal Mobility Controller 58 which provides the control logic for terminal authentication, location management, alerting, and routing to RPT/RTs. There is also provided a Terminal Mobility Data-store (TMD) 60 which is operative to maintain data associated with terminals.

Still further, the system includes a Personal Mobility Controller (PMC) which provides the control logic for user authentication, service request validation, location management, alerting, user access to service profile, privacy, access registration, and call management. PMC 62 is provided in communication with a Personal Mobility Data-store (PMD) which maintains data associated with users.

Finally, the system includes Operations, Administration, Maintenance, and Provisioning, (OAM & P) systems 66 which monitor, test, administer, and manage traffic and billing information for personal communications services and systems. PCS 38 is also provided in communication with Auxiliary Services 68, Interworking Functions (IWF) 70 and External Networks 72. In accordance with the above-referenced working document for Stage 2 service description, auxiliary services 68 are defined as a variety of services such as voice mail, paging, etc. which may not be provided by the PCS 38. IWF 70 are further defined as mechanisms which mask the differences in physical, link and network technologies into consistent network and user services. Still further, external networks 72 are defined as other voice, digital data, packet data, and broadband data networks.

FIG. 5 provides a unified functional model of the detailed system of FIGS. 4a–4b. This functional model is derived from the PCS reference architecture in FIG. 4 by aggregating the terminal entities (RT and RPT) into a single functional grouping RTF, and aggregating RP, RPI, and RPC into another single functional grouping RCF in accordance with the Stage 2 service descriptions for PCS. The model includes Call Control Function (CCF) 74, Service Switching Function (SSF) 76, Service Control Function (SCF) 78, Service Data Function (SDF) 80, Service Resource Function (SRF) 82, Radio Control Function Access Control Function (RACF) 84, Radio Control Function (RCF) 86, and Radio Termination Function (RTF) 88. The functions of the terminal elements are more fully described in the Stage 2 service description for PCS.

Wireless communication services such as the above cellular and PCS systems, have been quickly embraced by those people whose business requires them to travel frequently and to be in constant communication with their clients and associates. The increased use of wireless communication services, however, have caused headaches for emergency operators and other position dependent service providers who require precise location data. As known to those skilled in the art, under current wireless technology, position data is strictly limited to relatively large coverage areas and sectors thereof as defined by the RF characteristics, i.e. footprints, of the associated base station. As explained below, these coverage areas are generally unsuitable for most commercial and consumer applications.

In the late 1960's, federal legislation was enacted which established the 9-1-1 telephone number as a national emergency resource. In land-based systems, Enhanced 9-1-1 (E 9-1-1) wireline technology provides the caller's Automatic Location Identification (ALI) with reasonable accuracy, cost and reliability, to a Public Safety Answering Point (PSAP) via a defacto standard. ALI is generally accomplished by receiving the ANI, or Automatic Number Identification, during call setup to the PSAP. A database query, given ANI, provides ALI to the emergency call taker display terminal as both parties establish the voice channel.

Currently, however, wireless technology does not provide ALI. As a result, an ever-increasing percentage of emergency telephone calls can be tracked no further than the originating base station. As readily seen, the heart of the problem for providing E9-1-1 ALI services for wireless communication customers lies in accurately and reliably determining the handset location, under any circumstance, at low cost.

Against this background, there have been previous attempts to provide methods and systems which generally identify the positions of wireless communication system users in cell site coverage areas and sectors thereof. See, for example, U.S. Pat. No. 4,876,738 issued to Selby and assigned to U.S. Phillips Corporation. Selby discloses a registration procedure in which the base station monitors the location of the mobile unit by cell site. The effect is to allow enlargement of the registration area if the mobile unit consistently roams between two cells.

See also, U.S. Pat. No. 5,179,721 issued to Comroe et al and assigned to Motorola, Inc. Comroe discloses a method for inter-operation of a cellular communication system and trunking communication system by transmitting an access number for each system such that the mobile unit may be used as a cellular telephone and a trunking communication device.

Still further, see U.S. Pat. No. 5,097,499 issued to Consentino and assigned to AT&T Bell Laboratories. Consentino teaches a method for preventing an overload in a reverse channel by delaying the time of the generation of timing stamps on markers.

These methods and systems, however, have proven unsuitable for commercial and consumer applications where users may, at any given time, travel through very small portions of numerous cell site coverage areas and sectors. Under current wireless technology, and as described in the prior art referenced above, presently available positioning methods and systems are limited to a determination of whether the user is within one or more predetermined cell site coverage areas or sectors. These prior art systems are incapable of providing further detail, i.e. exactly where in the cell site coverage area the user is located.

Prior art attempts to design higher accuracy positioning systems which utilize commercial broadcast transmissions, for example, have also met with limited success. See, for example, U.S. Pat. Nos. 4,054,880 (Dalabakis et al) and 3,889,264 (Fletcher) which disclose what are known as "delta-position" systems. These prior art patents describe systems using three spectrally spaced-apart radio signals, each of which is an independent AM radio signal. The systems typically have a vehicle carried mobile receiver, with a separate tuner for each station, and a second receiver at a fixed, known position. As disclosed, these systems count "zero crossing counts", each of which indicates that the user has moved a certain distance from his or her previous location. In operation, if it is desired to determine the current position of the user, a starting position must first be specified. A fixed position receiver detects frequency drift of the transmitters, which is used to adjust and coordinate zero crossing counts made by the mobile receivers.

These systems are termed "delta-position" systems because they determine only the distance and direction traveled by a mobile user from any particular starting point. Neither Dalabakis et al nor Fletcher actually determines the position of the mobile user.

See also, U.S. Pat. No. 5,173,710 to Kelley et al which discloses the use of a fixed position receiver which is adapted to determine frequency drift along with the relative phases of various unsynchronized FM broadcast signals originating from known fixed locations. As disclosed by Kelley, each of the fixed transmitters transmits a beacon signal having a phase that is unsynchronized with the phases of the beacon signals of the other transmitters. These signals are 19 kHz analog pilot tones generated by commercial broadcast stereo FM stations. The fixed receiver receives the beacon signals, determines the relative phases of the beacon signals, and broadcasts data representing these relative phases for receipt by the mobile receiver which is at an unknown location. Each mobile receiver includes phase measurement circuitry that detects the phases of the beacon signals at the mobile receiver's current position on multiple distinct carrier frequencies such that the current position of the mobile unit may be determined when used in conjunction with the fixed receiver broadcast data.

See also, U.S. Pat. Nos. 5,055,851; 4,891,650; and 5,218,367, all issued to E. Sheffer and assigned to Track Mobile, Inc. Like the '650 patent, the '851 patent utilizes measurements of the mobile unit's signal strength which is detected by some number of neighboring base stations in order to calculate location. In operation, each base station transmits a special packet of data which includes this information for receipt by the MTSC. Another packet of information, the actual vehicle alarm distress call (this is not the same as a 9-1-1 call), is also sent to the MTSC. The MTSC sends these two information packets to a Track Mobile alarm center personal computer. The computer matches both packets using a simple algorithm in order to find the vehicle's distance from the base station cell center point. As disclosed, this is done preferably with four neighboring base station cell site measurements along with arcuation or line intersection techniques. The results are displayed on a computer screen map. A 9-1-1 call may then be initiated by a Track Mobile attendant, based on a verbal request from the originating mobile user.

The '367 patent operates in much the same way although it uses a modified handset including a modem, to send signal strength measurements received at the mobile unit, through the cellular network to the Track-Mobile alarm center. Only the downlink signal strengths, received at the mobile unit, are used to estimate location. The location is determined from the same algorithm as in the '851 patent, but includes a refinement—antenna sector ID—if known. As disclosed, the sector ID information reduces error by effectively slicing the cell circle into one of three pie-shaped sections. In the case of low power PCS installations, it is likely that omnidirectional antennas would be used, thus precluding the use of this sector refinement.

None of the systems referenced above, as well as general time difference of arrival location systems such as LORAN, NAVSTAR, and GPS, as used for example in U.S. Pat. No. 4,833,480, issued to Palmer et al, have proven suitable for commercial applications since, by design, they require specially adapted receivers to receive and process the pilot tones, GPS signals, etc. at the mobile unit. This sophisticated end equipment, of course, significantly adds to the cost of the corresponding mobile unit. In the case of hand portable units, this additional equipment further results in a handset which is extremely bulky and difficult to handle. As a result, these systems have proven unsuitable for both large scale commercial applications, as well as ordinary consumer use.

When applied to wireless communications of interest to the present invention, i.e. communications in the frequency band from 800 MHz to 2.5 GHz, these prior art systems are further considered unsuitable for commercial applications in view of their anticipated use of excessive frequency spectrum. More specifically, it is anticipated that for proper operation, these systems would necessarily require transmission of signals on separate channels which would utilize an unacceptable amount of additional spectrum.

Still further, the prior art systems fail to account for changes in environmental conditions. For example, it is known to those of skill in the art that for GPS receivers, the location calculation will not work unless there is a clear view of at least 3–4 satellites. In dense urban areas, especially at the street level, this condition could easily prevail. Thus, no location estimate would be available if less than three satellite signals can be received.

In many office buildings, the metal content of the windows is also sufficient to preclude effective satellite reception. To this end, if all wireless antennas were isotropic and were located in flat and open terrain, estimating the location of a handset/mobile unit using the prior art Trackmobile signal strength technology might be sufficient. Unfortunately, the known advantage of the PCS world, and to a reasonable extent, cellular, does not have a flat and open terrain. None of the prior art patents work in areas where there are obstructions to the radio signal's path like buildings, trees, hills, and automobiles.

Seasons are also known to have a dramatic affect on propagation where radio waves are significantly attenuated by tree leaves in the summer, but less so in the winter. Thus, actual RF field data gathered in one season may not be accurate in another season. As readily seen, precisely predicting location based on RF propagation loss has generally been an intractable problem, due to the complexity of factors, as well as the data collection difficulties in constructing the necessary databases needed to supply the actual field data. Thus, the principles relied upon by the above-referenced prior arts patents, free space loss, rarely exists, as obstructions and interference increases daily, even in the most optimal RF environments.

Consequently, a need has developed to provide a positioning method which may be practically and economically implemented for use in wireless communication systems and, in particular, in the microwave band from 800 MHz to 2.5 GHz.

Still further, a need has developed to provide such a method which may be used by service providers to provide precise location information for use in emergency situations such as locating an Enhanced 9-1-1 (E9-11) 1) caller, enforcing restraining orders and house arrests, confirming the intended location of a user at predetermined times and the like. It is further desirable that such a method be compatible with existing wireless telephone technology and should not degrade the operation of an existing system. Finally, such a system should neither require the allocation of more radio frequencies than are currently allocated to wireless telephone systems, nor require a substantial portion of existing wireless frequencies.

DISCLOSURE OF THE INVENTION

It is a general object of the present invention to overcome the limitations of the prior art by providing a positioning method for accurately determining the location of a mobile unit.

More particularly, it is an object of the present invention to provide a method for determining the position of a mobile unit by obtaining directional information from Spatial Division Multiple Access (SDMA)-equipped and non-SDMA-equipped base stations.

In carrying out these and other objects, features and advantages of the present invention, a method is provided for determining the position of a mobile unit such as, for example, a wireless telephone, Personal Digital Assistant (PDA), or similar interactive electronic device. The method is also applicable to spread-spectrum residential cordless telephones which operate in the 900 MHz frequency band.

According to the invention, the method is provided for use in a wireless communication system, sometimes also referred to as a public land mobile telephone system, which includes a plurality of base stations each having a corresponding coverage area. For each of the base stations, a plurality of RF measurements are determined in cooperation with the receiver, including the link budget of the base station, for a predetermined plurality of distances and directions. The determined RF measurements for each of the base stations are modeled as a scaled contour shape having minimum and maximum boundaries and which is capable of being projected on a mapping system such as an orthophotograph. The base stations which neighbor the mobile unit are thereafter determined so as to define a first bounding polygon area by their intersecting contours. The first bounding polygon area generally describes the relative position of the mobile unit.

In one preferred embodiment, each of the base stations is SDMA-equipped and includes what is known to those skilled in the art as a smart antenna. The Smart antenna has a predetermined number of fixed lobes each of which is oriented in a predetermined direction and is operative to communicate with a mobile unit on a corresponding communication channel within a known coverage area. In keeping with the invention, the lobes of the neighboring base stations which are in communication with the mobile unit must be determined along with their orientations in terms of azimuth angles so as to define a second bounding polygon area that describes the relative position of the mobile unit. By determining where the first and second bounding polygon areas intersect, a location polygon may be defined which more precisely describes the position of the mobile unit in terms of minimum and maximum error estimate.

In further keeping with the invention, an alternative embodiment is similarly provided wherein each of the SDMA-equipped base stations includes a smart antenna with a predetermined number of floating lobes. In this embodiment, each of the lobes is operative to track and communicate with a mobile unit on a corresponding communication channel by changing its orientation within a predetermined direction range. Like the above-described method, for each of the base stations, a plurality of RF measurements are determined in cooperation with the receiver, including the link budget of the base station, for a predetermined plurality of distances and directions. The determined RF measurements for each of the base stations are modeled as scaled contour shapes each having minimum and maximum boundaries and which is capable of being projected on a mapping system such as an orthophotograph. The base stations which neighbor the mobile unit are thereafter determined and their corresponding contours are analyzed to further determine where they intersect. These intersections will define a first bounding polygon area that describes the relative position of the mobile unit.

By determining which lobes of the neighboring base stations are in communication with the mobile unit, their corresponding orientation ranges may be described in terms of azimuth angles so as to define a second bounding polygon area that describes the relative position of the mobile unit. Like the above embodiment, it may thereafter be determined where the first and second bounding polygon areas intersect so as to define a location polygon which more precisely describes the position of the mobile unit in terms of minimum and maximum error estimate.

In further keeping with the invention, there is provided yet another alternative embodiment which is similarly provided for use in a wireless communication system including a plurality of base stations each having a non-SDMA antenna with a corresponding coverage area. In this embodiment, each of the base stations is further provided a plurality of bandpass filters in electrical communication with a corresponding antenna. Each of the bandpass filters includes a corresponding waveguide and is operative to receive mobile unit signals from predetermined directions in predetermined frequency slots.

Again, for each of the base stations, a plurality of RF measurements are determined in cooperation with a receiver, including the link budget of the base station for a predetermined plurality of distances and directions. The determined RF measurements for each of the base stations are thereafter modeled as scaled contour shapes having minimum and maximum boundaries and which are capable of being projected on a mapping system such as an orthophotograph. The base stations which neighbor the mobile unit are thereafter determined and their corresponding contours are analyzed to further determine where they intersect. These intersections define a first bounding polygon area that describes the relative position of the mobile unit.

By determining the communication frequencies of the neighboring base stations in the corresponding directions of the received mobile unit signals, a second bounding polygon area may be defined which describes the relative position of the mobile unit. Again, it may thereafter be determined where the first and second bounding polygon areas intersect so as to define a location polygon which more precisely describes the position of the mobile unit in terms of minimum and maximum error estimate.

In each of the above embodiments, once the location polygon area has been defined, the latitude and longitude of the center of the polygon area may also be determined whereupon the street addresses contained therein may be learned through reference to one or more databases.

In keeping with the invention, the modeling of the determined RF measurements as scaled contour shapes requires the initial segmenting of the coverage areas of each of the base stations into a plurality of arc segments. For each of the arc segments, a plurality of single or multiple regressions are thereafter performed so as to convert actual data into a corresponding plurality of mathematical curve-fit equations, each representing a relationship between a predetermined measurable variable, i.e. Relative Signal Strength Indication uplink ($RSSI_{up}$), Relative Signal Strength Indication downlink ($RSSI_{down}$), Word Error Rate uplink ($WER_{up}$), Word Error Rate downlink ($WER_{down}$), Quality Indication uplink ($QI_{up}$), Quality Indication downlink ($QI_{down}$), Time Differential uplink ($TD_{up}$), Time Differential downlink ($TD_{down}$), instantaneous power of each transmitter, start-up power of each transmitter, etc. and distance from the base station. Note that in certain cases of TDMA and CDMA techniques, the initial and instantaneous transmitter power levels must also be known.

For each of the arc segments, the degree of fit of the corresponding mathematical equations may thereafter be determined by comparing each of the mathematical equations with actual data. The equations may further be optimized by determining which has the best correlation and least standard error for a predetermined portion of each arc segment. Finally, the optimized mathematical equations may be combined for each arc segment so as to form the scaled contour shape corresponding to each base station.

In further keeping with the invention, a Genetic Algorithm (GA) may also be used to optimize the parameters of each of the single or multiple regressions so as to further improve the degree of fit for greater correlation and minimum standard error.

Still further, in cases where there is generally poor correlation between all of the mathematical equations of an arc segment and the actual data, the corresponding base station may be instructed along with the receiver (i.e., the mobile unit) to each temporarily change their transmission frequencies by 10–40 MHz. Thereafter, additional RF measurements may be obtained for the base station at the changed frequency, including its link budget, for the same predetermined plurality of distances and directions, thus yielding an increased number of variables for consideration and analysis.

BRIEF DESCRIPTION OF THE DRAWINGS

The foregoing aspects and many of the attendant advantages of this invention will become more readily appreciated as the same becomes better understood by reference to the following best modes for carrying out the invention, when taken in conjunction with the accompanying drawings.

BEST MODES FOR CARRYING OUT THE INVENTION

As referenced above, the present invention is adapted for use in a wireless communication system, sometimes also called a public land mobile telecommunications system. It should be understood, however, that the method of the present invention may be suitable for use with most interactive electronic devices such as the Personal Digital Assistants (PDAs) and the like. For example, in the case where a PDA is available, through a series of mutually agreed upon message formats between the lap and the PDA, location information can be sent to the PDA device instead of forwarding information to, or in addition to, the PSTN. The following disclosure is thus intended as one of example and not limitation.

Figure 1:
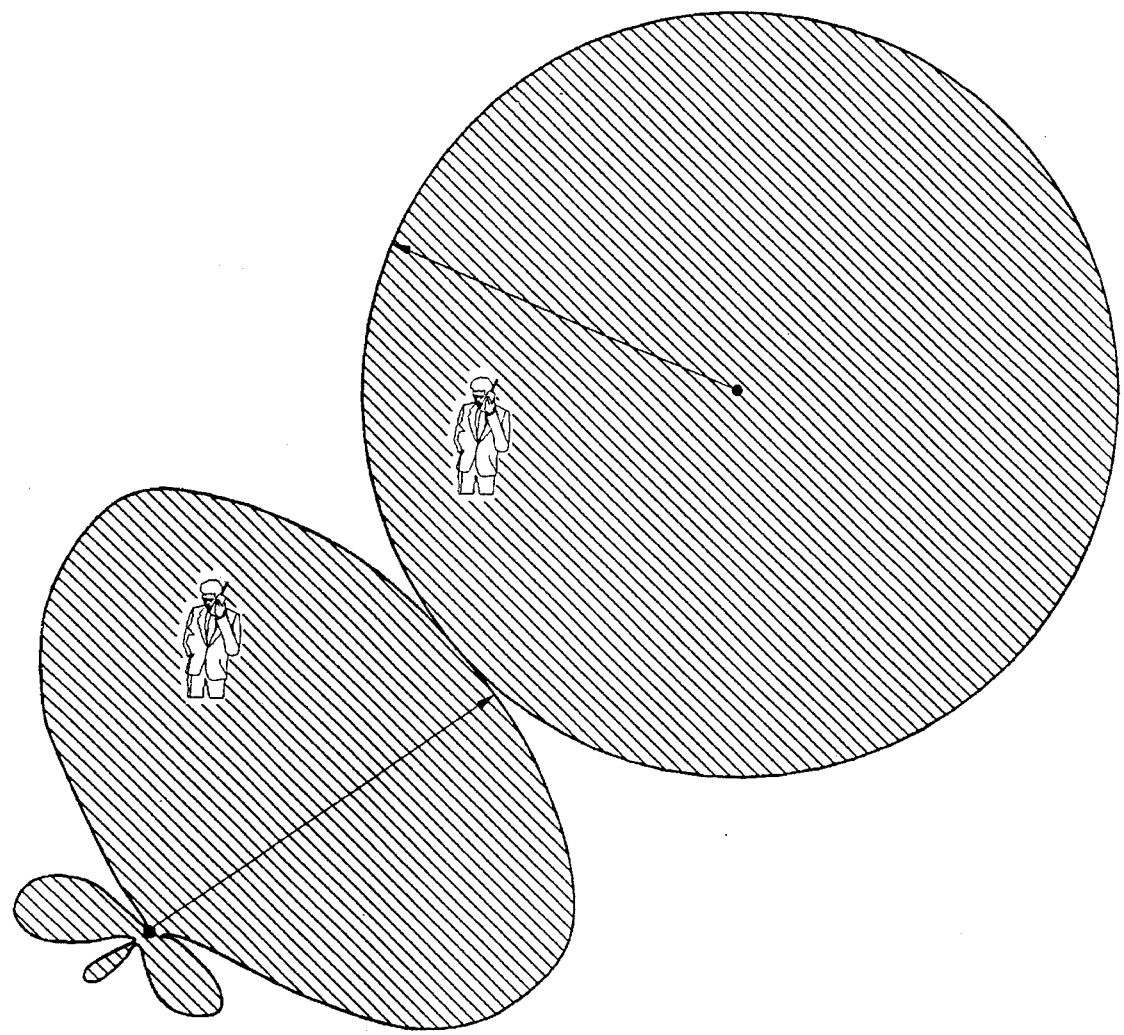
FIG. 1 is a schematic diagram illustrating conventional base station 911 position accuracy.
Figure 2:
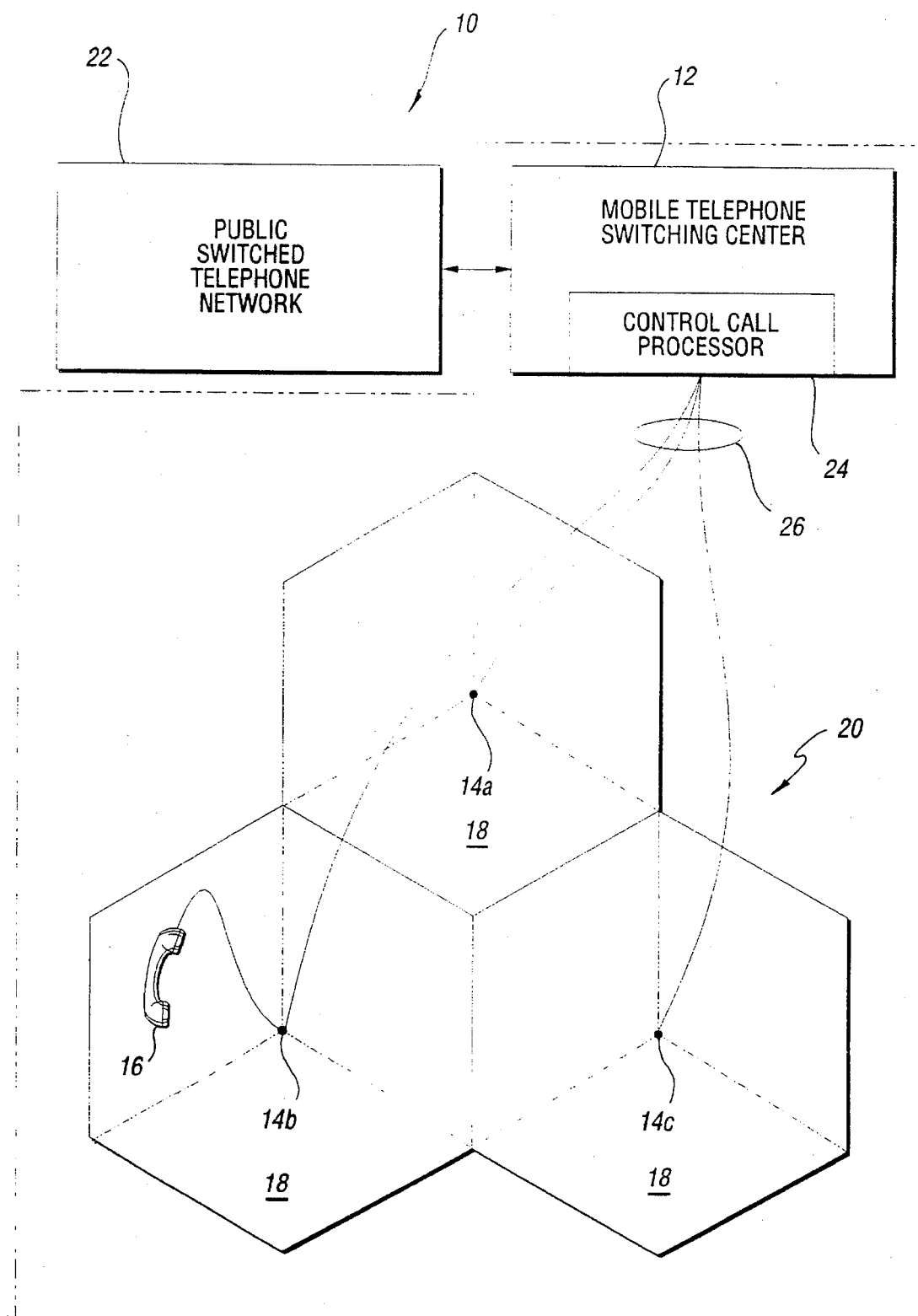
FIG. 2 is a generalized schematic diagram of a prior art cellular telephone system.
Figure 3:
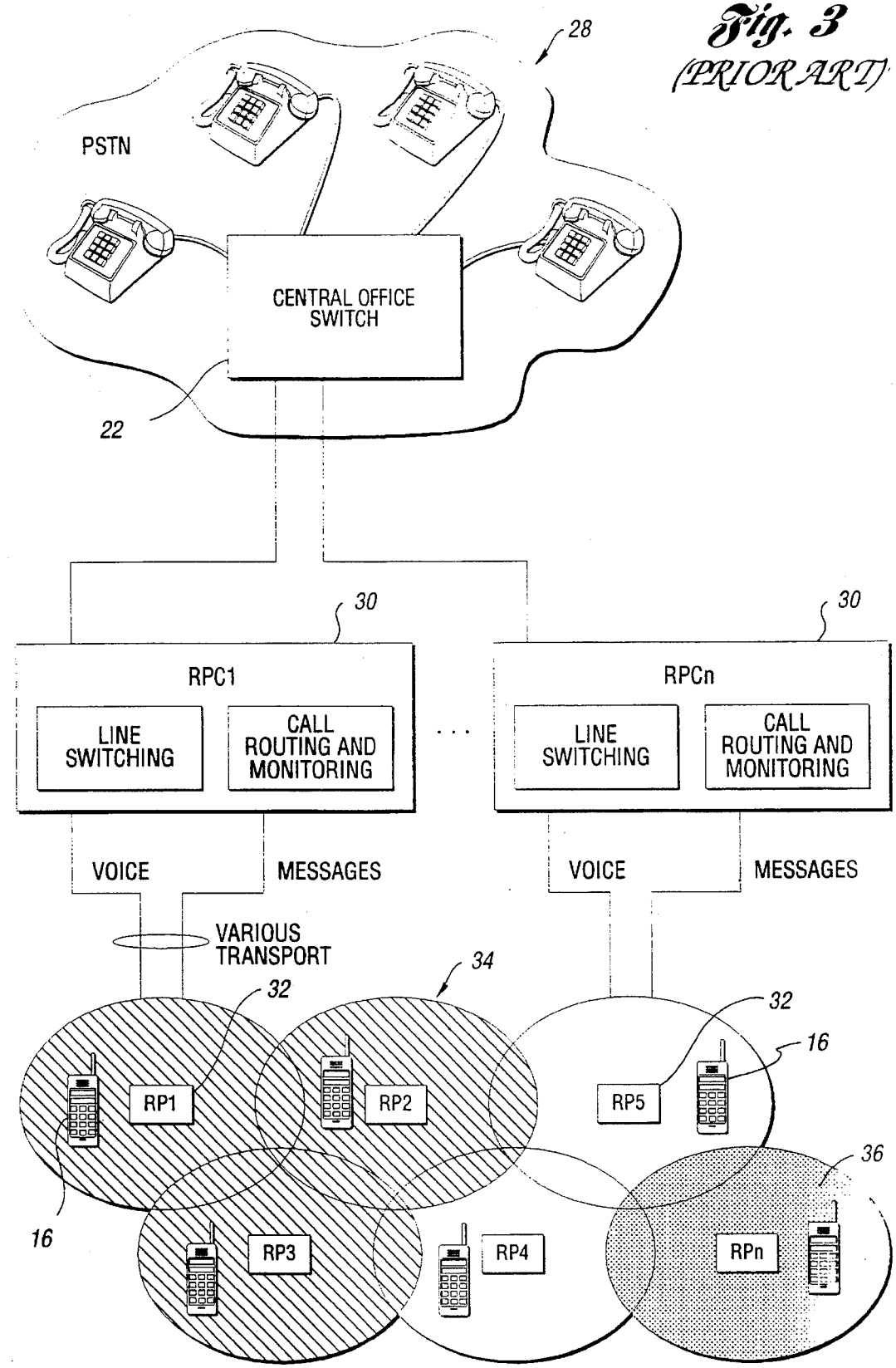
FIG. 3 is a generalized schematic diagram of a prior art Personal Communications System (PCS)
Figure 4A:
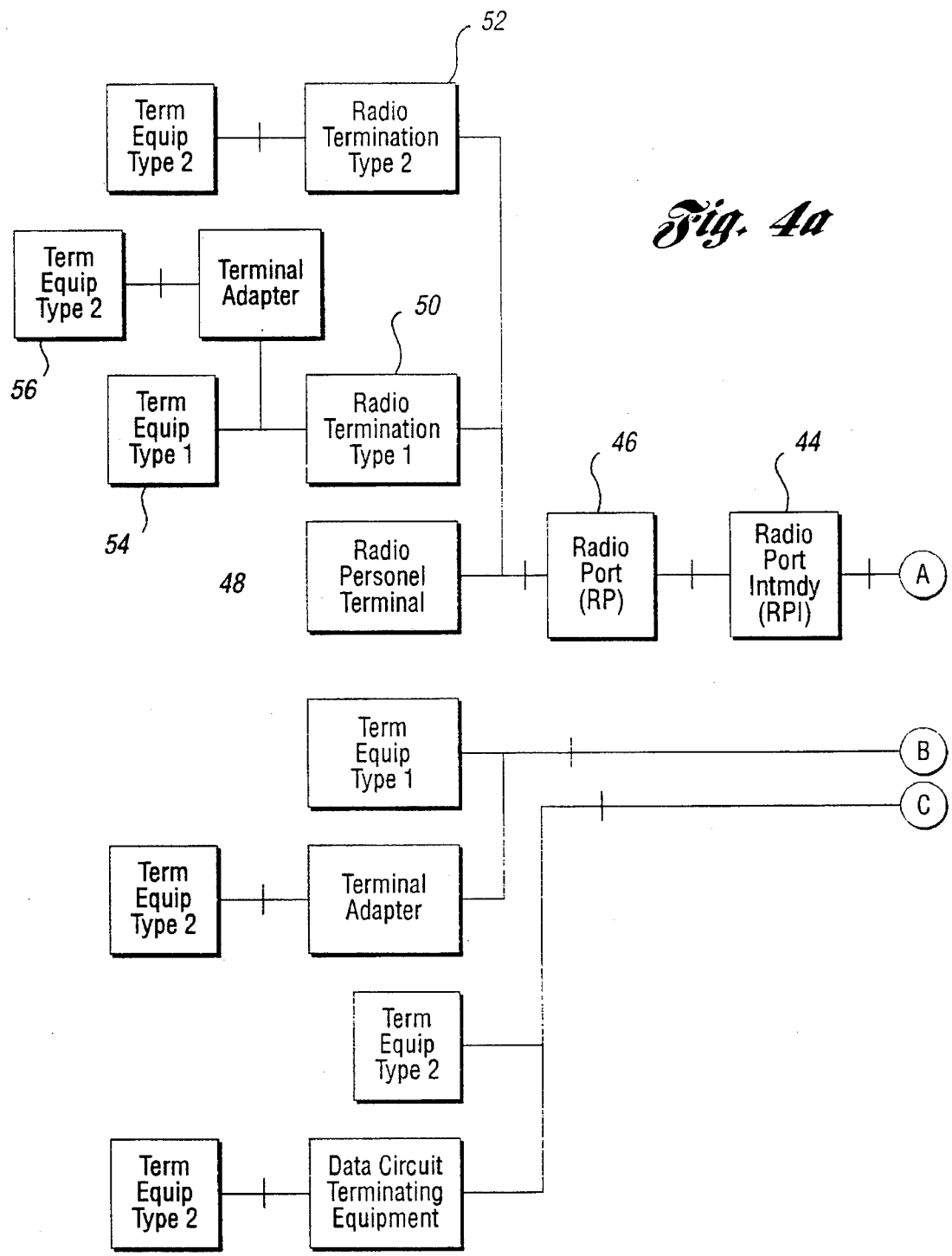
FIG. 4 is a detailed schematic diagram of the system of FIG. 2.
Figure 4B:
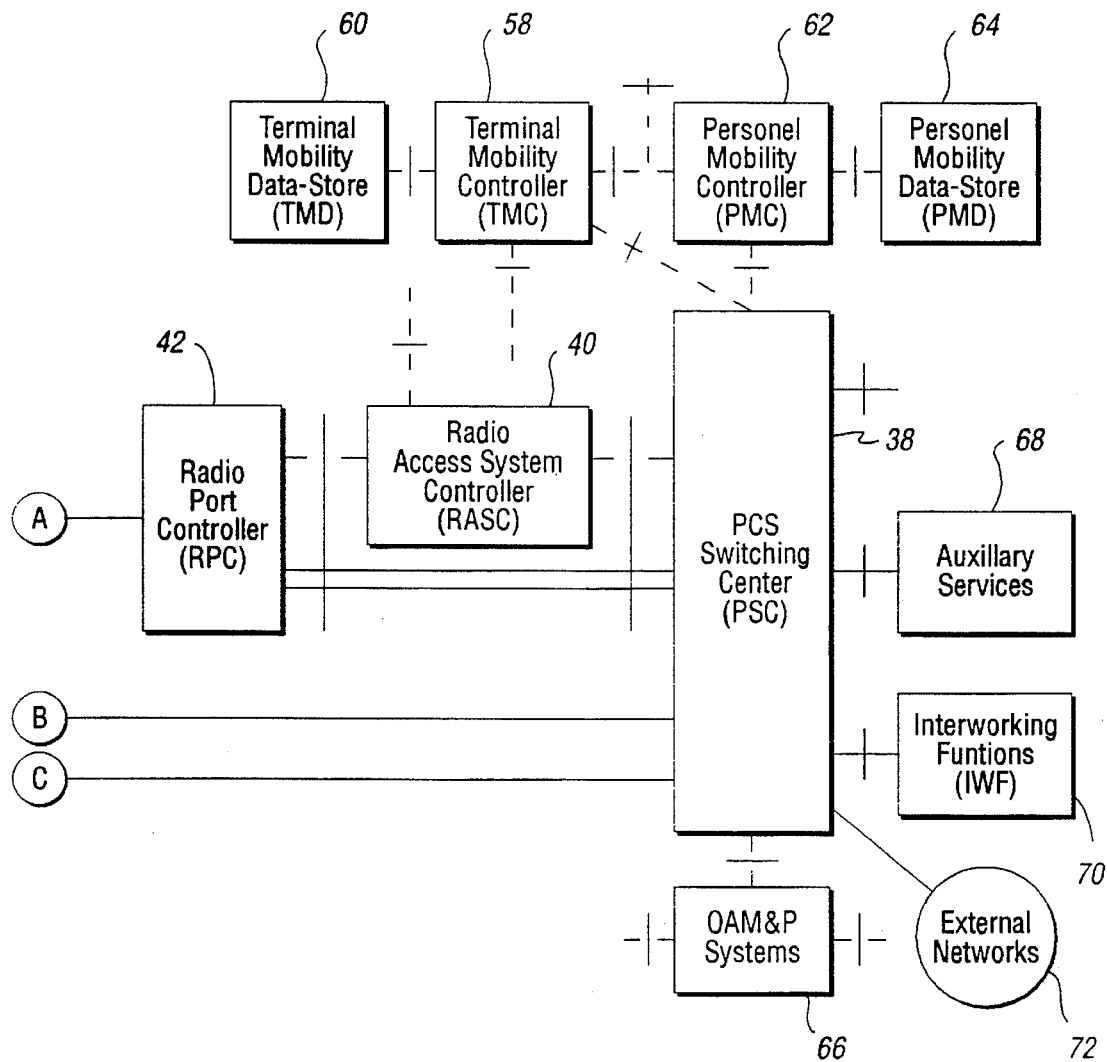
Figure 5:
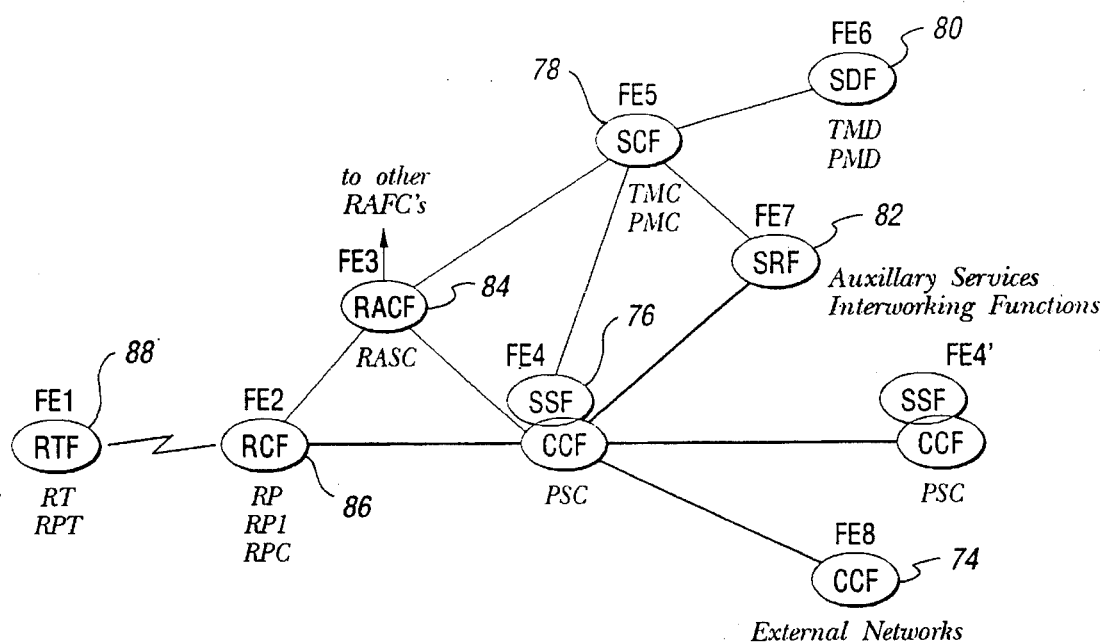
FIG. 5 is a unified functional model of the system of FIGS. 2 and 3.
Figure 6:
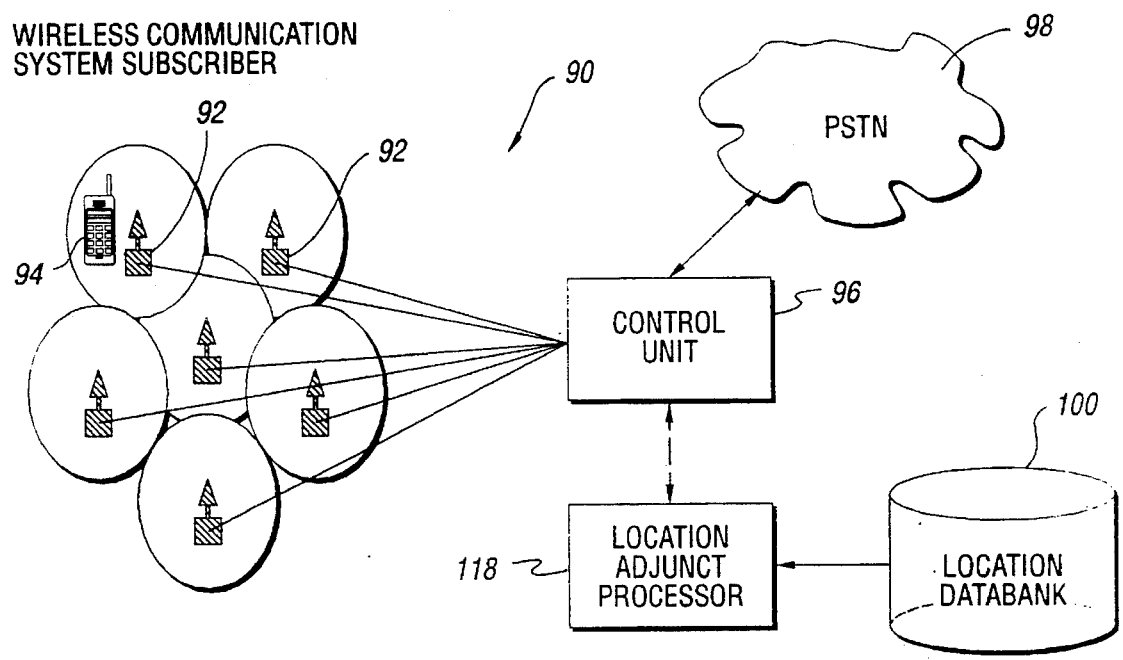
FIG. 6 is a schematic diagram of a generalized positioning system which may be used in accordance with the method of the present invention.

With reference to FIG. 6 of the drawings, there is provided a schematic diagram of a generalized positioning system which may be used in accordance with the method of the present invention. The positioning system is designated by reference numeral 90 and includes at least one base station 92 such as a Radio Port which is operative to receive calls from one or more mobile units 94 such as Radio Personal Terminals (RPTs) over air interface channels. The system further includes a control unit 96 which is provided in electrical communication with the Public Switched Telephone Network (PSTN) 98. The functions of control unit 96 may be implemented in a Mobile Telephone Switching Center (MTSC) when used in a cellular telephone network or they may be implemented in a Radio Port Controller, RASC, etc. when used in a PCS system or the like. A location databank 100 is also provided which is operative to store real-time RF measurements for the base stations 92, including their link budgets.

Figure 7:
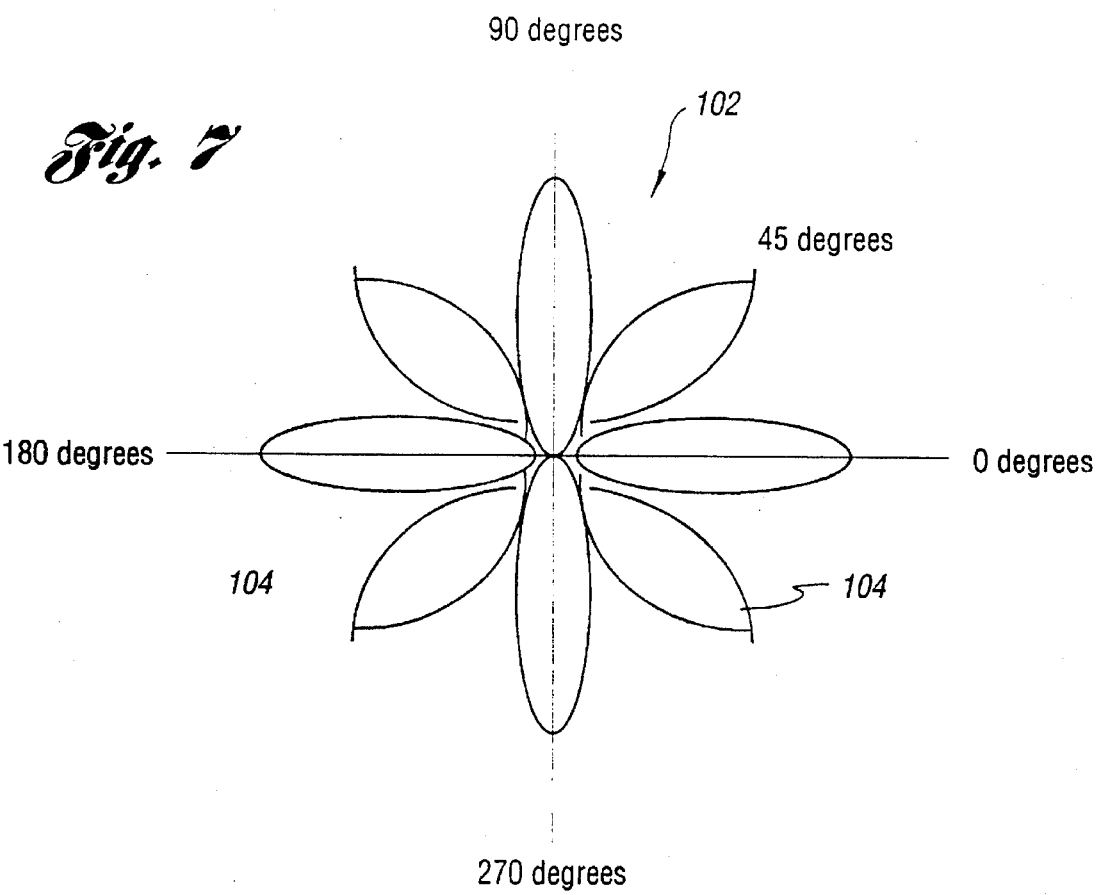
FIG. 7 is a schematic diagram of a fixed lobe antenna.
Figure 8:
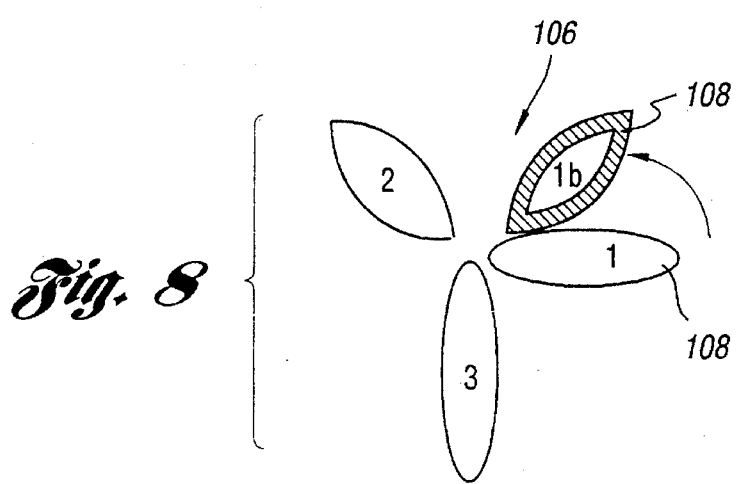
FIG. 8 is a schematic diagram of a floating lobe antenna.

Each of the base stations 92 may be Spatial Division Multiple Access (SDMA)-equipped and may include a fixed-lobe or floating-lobe "smart antenna" as the terms are known and used by those skilled in the art. FIG. 7 illustrates a smart antenna 102 having a predetermined number of fixed lobes 104 which are oriented in a predetermined direction and operative to communicate with a mobile unit 94 on a corresponding communication channel within a known coverage area. Similarly, FIG. 8 illustrates a smart antenna 106 having a predetermined number of floating lobes 108, each oriented in a predetermined direction and operative to communicate with a mobile unit 94 on a corresponding communication channel by changing its orientation within a predetermined direction range.

The fixed lobe smart antenna of FIG. 7 is shown with eight lobes which provide direction readings of 0°, 45°, 90°, 135°, etc. As readily seen, the accuracy would be plus or minus 22.5°. In contrast, the floating lobe smart antenna of FIG. 8 is shown with three lobes. As known to those skilled in the art, theoretically, the maximum number of lobes possible for a floating lobe smart antenna is equal to the number of antenna elements. Thus, for example, the floating lobe antenna shown in FIG. 8 corresponds to a maximum of three elements. In operation, floating lobes track users as they move. Thus, a lobe can move from position 1 to 1B as the user moves. At the time of an emergency call, the direction (azimuth) of the user would be obtained from the smart antenna. For example, if the user was in position 1, the azimuth angle was 0 and in position 1B, about 40°–45°. An estimate of the accuracy of this measurement would then be sent to a location databank. The accuracy would, of course, be limited by the width of the lobe which is known to the smart antenna.

Figure 9:
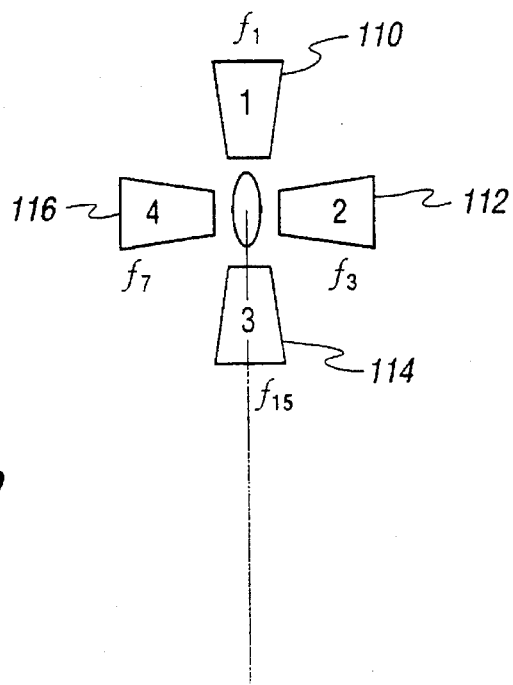
FIG. 9 is a schematic diagram of a bandpass filter equipped antenna.

In an alternative embodiment shown in FIG. 9, each of the base stations 92 may be non-SDMA-equipped. In the case of bandpass filter use with nonsmart antennas, each filter is designed to receive signals in different frequency slots. For illustrative purposes, it is therefore assumed that there are eight frequency slots available in a (Time Division Multiple Access (TDMA) system for a handset to communicate to the antenna. In regular operation, a handset/mobile unit sends a pilot signal to a base station informing the base station that it desires to transmit and the base station assigns a frequency slot (one of eight) to the handset. Assume further that bandpass filters are built that filter 1 110 would only pass those signals that correspond to frequency 1. In order to have separation between filters passing frequencies, every other frequency slot is therefore assigned to a filter. Thus, filter 2 112 passes only frequency 3. Similarly, filter 3 114 passes only frequency 5. Still further, filter 4 116 passes only frequency 7. The waveguides that feed into the filters are designed in such a way that they pick signals from a specific direction (in this case, for example, North, West, South, East or 0°, 90°, 180°, 270°). Now in the case of an emergency call, for example, the base station tells the mobile unit to go to frequency 1 and transmit a brief (coded or known) pulse, then to frequency 3 and the same pulse, then to frequency 5, then to frequency 7.

Depending on the location of the user, one or more of these filters can receive signals. If a first user is dead North, for example, of the antenna, most likely only filter 1 will receive a signal while the mobile unit is jumping from frequency to frequency. This information would therefore be sent to the location databank (in degrees or maybe the ID of the filter, just like the "smart antenna" case). An accuracy estimate would also be sent. In this case, the accuracy would depend on how many filters are used and what kind of processing is done in the filters.

Further enhancements to the estimate can be obtained with processing at the filters. For example, if the signal strength for each received pulse is calculated, then that could be used to refine the estimate. Imagine a user 2 which is North-Northwest. Both filter 1 and filter 4 would receive signals while the mobile unit is jumping from frequency to frequency. However, the received signal strength of filter 1 would be larger than filter 4 which would suggest that the user is to the North of Northwest. If signal strength is not measured, the user could only guess Northwest since both filters 1 and 4 received signals.

As can readily be seen, this type of scheme is useful and practical for antennas placed at intersections. Along the streets, the signals would be funneled to the filters. In the case of anomalies (a user that is dead North) transmits a pulse at frequency 3 (the frequency for filter 2) and through a long path, this is picked up by filter 2. In this case, the user could only hope to receive a pulse at frequency 1 (the frequency for filter 1) that is stronger than the one at frequency 3 since the frequency 1 pulse followed more straight path. Thus, measuring signal strength of the pulse received at the bandpass filter would help in such cases.

Figure 10:
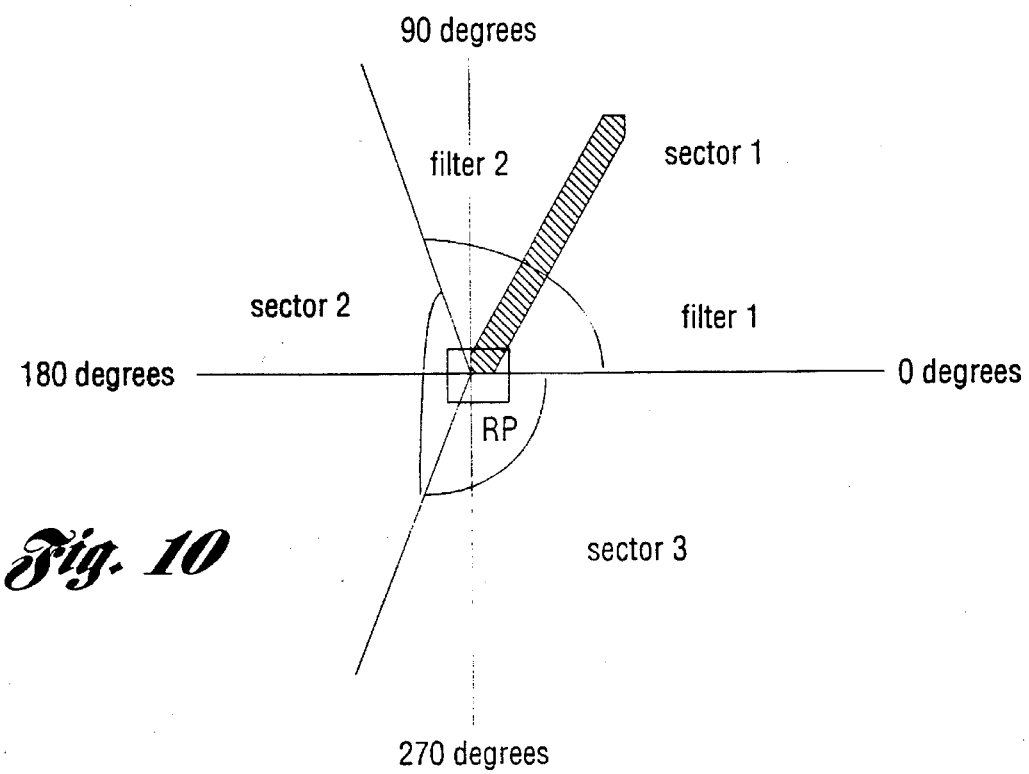
FIG. 10 is a schematic diagram of a bandpass filter equipped sectorized antenna.

In a further alternative embodiment, the antennas may be non-SDMA-equipped and sectorized. With reference to FIG. 10 of the drawings, it can be seen that in such a case, direction information can only be obtained which is plus or minus 60° accurate. Therefore, in order to make this more accurate, selective filters can be placed on the sectors so as to increase the accuracy of direction information. As seen, if two filters are placed in a sector, plus or minus 30° of accuracy would be obtained. These selective filters, such as waveguides, can be rectangular, circular, cylindrical, or any other suitable shape. By using the geometry, waveguides are designed to block certain frequencies to be passed (selective high pass filters). In operation, the waveguides will feed into an RF processing circuit where the signal will be analyzed for its contents.

The importance of this direction information is that it is not possible in all cases to triangulate and obtain direction information. For example, triangulation in 2D requires at least signals from three Radio Ports. Similarly, triangulation may not be reliable in some areas due to environmental conditions, obstructions, etc.

In the system of FIG. 6 which is operative to be used in accordance with the teachings of the present invention, a location databank 100 is also provided which is operative to store real-time measurements for base stations 92, including their link budgets. As explained in further detail herein, these RF measurements may include, for example, Relative Signal Strength Indication uplink ($RSSI_{up}$), Relative Signal Strength Indication downlink ($RSSI_{down}$), Word Error Rate uplink ($WER_{up}$), Word Error Rate downlink ($WER_{down}$), Quality Indication uplink ($QI_{up}$), Quality Indication downlink ($QI_{down}$), Time Differential uplink ($TD_{up}$), Time Differential downlink ($TD_{down}$), instantaneous power of each transmitter, start-up power of each transmitter, etc. and distance from the base station.

Finally, the positioning system 90 includes a Location Adjunct Processor (LAP) 118 which may be an Intelligent Peripheral (IP) or other suitable device which is in electrical communication with the location databank 100 and control unit 96. The LAP 118 is operative to access the location databank 100 and determine and forward the location of the mobile unit 94 to the control unit 96.

As shown, positioning system 90 is directed for use with the Public Switched Telephone Network (PSTN) 98 which is provided in electrical communication with control unit 96. Control unit 96 is therefore operative to receive calls forwarded by base stations 92 temporarily suspend call processing, and generate call information request signals. The LAP 118 receives the call information request signals, accesses databank 100 and determines and forwards the location of the mobile unit 94 to the control unit 96. The call is thereafter forwarded to the PSTN 98 along with the determined mobile unit location.

Applicants recognize that various alternative embodiments of positioning system 90 may be used in accordance with the teachings of the present invention as shown and described, for example, in co-pending U.S. patent application Ser. No. 08/314,477 filed Mar. 28, 1994 which has at all times relevant hereto been commonly owned with the present application.

At the threshold, it should be understood that each of the systems referenced above and used in accordance with the teachings of the present invention requires detailed location processing. This processing utilizes scaled contour shapes. The shapes are modeled based upon determined RF measurements for each base station 92. The location processing of the present invention thus focuses on the ability to predict and model RF contours using the actual RF measurements, then performing data reduction techniques such as curve-fitting techniques, Bollinger bands, and genetic algorithms, in order to locate a mobile unit and disseminate its location.

An example of a suitable software analysis tool is a program by Axcelis, Inc. termed "Evolver 2.0". This is an Axcelis spreadsheet program that can perform a genetic algorithm optimization of the parameters generated in the above curve fitting techniques.

Location Processing

More specifically, the location processing steps include the initial modeling of determined RF measurements for each of the base stations as a scaled contour shape having minimum and maximum boundaries which is capable of being projected on a mapping system such as an orthophotograph which may be digitally recorded. Thereafter, it must be determined which of the base stations can be "heard" by the mobile unit, i.e., which base stations are neighbors of the mobile unit. Once this information is known, it may further be determined where the corresponding contours of the neighbor base stations intersect so as to define a first bounding polygon area that describes the position of the mobile unit in terms of a minimum and maximum error estimate.

As readily seen, a key component of the present invention is the initial ability to diagram and model the RF propagation loss from a given Base Station/Radio Port, for various RF measurement arc segments, which will define entire contours. As those skilled in the art will recognize, in theory, if the "free space" power loss is known for all useful distances in all directions from a base station, then individual circular power loss contour shapes may be drawn around the base station. Assuming two or preferably three base stations are neighbors of the mobile unit, then RF measurements may be used to determine location via intersecting contours. The particular shape of the contour intersections is the bounding polygon that describes the location, in terms of the maximum error estimate.

Unfortunately, the principle of free space loss rarely exists when attempting to predict base station coverage areas since the surrounding buildings, trees, traffic signs and other geographical "clutter" blocks transmitted signals. To account for these variables involved in propagation prediction, the present invention therefore utilizes a number of segmented models and analysis techniques for data reduction purposes. The resulting output becomes the location databank which consists of a collection of component databases, many of which may be designed on a per base station basis. The component databases may include a base station database, a prediction database, a measured RF database, a generic curve fit database, a Bollinger band database, equipment-specific corrections database, and a run-time database as described in further detail below.

Base Station Database

In keeping with the invention, the base station database provides a detailed list of the attributes of every installed and proposed base station. Applicants contemplate that this database would contain the following data elements:

1. Name or identification of base station.
2. Base station vendor name, model number, serial number.
3. Latitude (LAT), Longitude (LONG), or at least accurate street location detail for conversion to/from LAT and LONG, and Altitude (ALT) of physical placement of base station.
4. Base station transmitter default power, instantaneous power for each active transmission channel, and power range.
5. Antenna gain contours (if omni-directional, otherwise sector make-up, and gains within each sector).
6. Whether or not a distributed antenna scheme is used, and if so, placement (LAT, LONG, ALT) of all remote antennas.
7. Nearby surrounding obstructions (e.g., the mounting surface of the RP: is it on a metal wall, in an elevator, or hanging in free space).
8. Base station transmitter operating frequency band (licensed, unlicensed), and allowed frequencies.
9. Whether or not a duplicated transmitter is used, and if so, include the identifying characteristics of each transmitter.
10. The PSAP associated with each base station.
11. Type of air interface: protocol and signaling (e.g., PACS, CDMA, GSM, DECT, CDMA, PHS-PHP, IS-54, IS-95, PCS-1900, B-CDMA, etc.) This information should be derived from the base station vendor name, model number, and serial number. Any dual or multi-mode capabilities must also be known and characterized.
12. Base station antenna gain contour. This information could be derivable from knowledge about the antenna's characteristics and surrounding obstructions.
13. The control unit associated with the base station, neighboring communication network topology and the associated central office. This information may be derived from knowledge of the control unit and its connected central office at the time the wireless communication system is originally engineered. Nonetheless, the network topology may change, due to a variety of reasons. For example, future base stations may use a signaling protocol arrangement with their control unit such that the base station can be easily moved around without prior notification to a centralized work manager system. A control unit may automatically discover the addition/deletion or in/out change of a particular base station. To the extent this automatic capability exists, a forwarding event report message must be sent to a system associated with the location service. In cases where the control unit is associated with a PBX, foreign exchange circuit, or similar remoting facility, the identification and end-to-end topology circuit arrangements will be needed.
14. Frequency Assignment Characterization (FAC). This should be derivable from the RP vendor, make/model information. If the FAC is automatic, then a potential incompatibility may exist during the performance of the location function. Knowing these details, and/or having the ability to control the occurrences of frequency assignment, can resolve incompatibilities.
15. Current operational RP status. This information should be derivable from the wireless communication network OAM and P systems that should routinely receive current information about the in-service state of the base stations. This information is needed, for example, because a planned, but not in-service base station, or a faulty base station, could disturb the location algorithm, if this information is otherwise not known.
16. Traffic load characteristics of the base station and its superior network. This may be derivable from the network planning activity, base station model characteristics, and dynamic monitoring by OAM and P systems, or each base station. For example, if a base station needed to perform an emergency location function, it cannot be invoked because it is at 100% of capacity, with no possibility to shed "non-emergency" load, then other techniques may be applied.

Prediction Database

This is a planning database primarily populated by, and used to support/interact with base station site planners and installation engineers. In accordance with the invention, it is used primarily to predict coverage. The location function accesses this database in order to require a rudimentary understanding of intended coverage area of newly planned cell sites and their operational status. Using the various RF propagation models and special plane curves, propagation coverage will be predicted for all base stations by examining the placement of the base station, local street widths, and the surrounding clutter. This provides a quick, inexpensive estimate of each base station's coverage.

Measured RF Database

In keeping with the invention, the measured RF database consists of actual measurements taken from the area surrounding the base station. These measurements could be taken by technicians during base station site installation or any other collection technique. Both uplink (handset to base station) and downlink (base station to handset) measurements will be made for data such as Received Signal Strength Indicator (RSSI), Word Error Rate (WER), Quality Indicator (QI), and Time Differential. Each of these variables are known to those skilled in the art and will therefore not be discussed in further detail. These measurements will be recorded along with the exact location at which the measurements were taken. All measurements are made within an arc segment region as discussed in further detail below.

Generic Curve Fit Database

Figure 11:
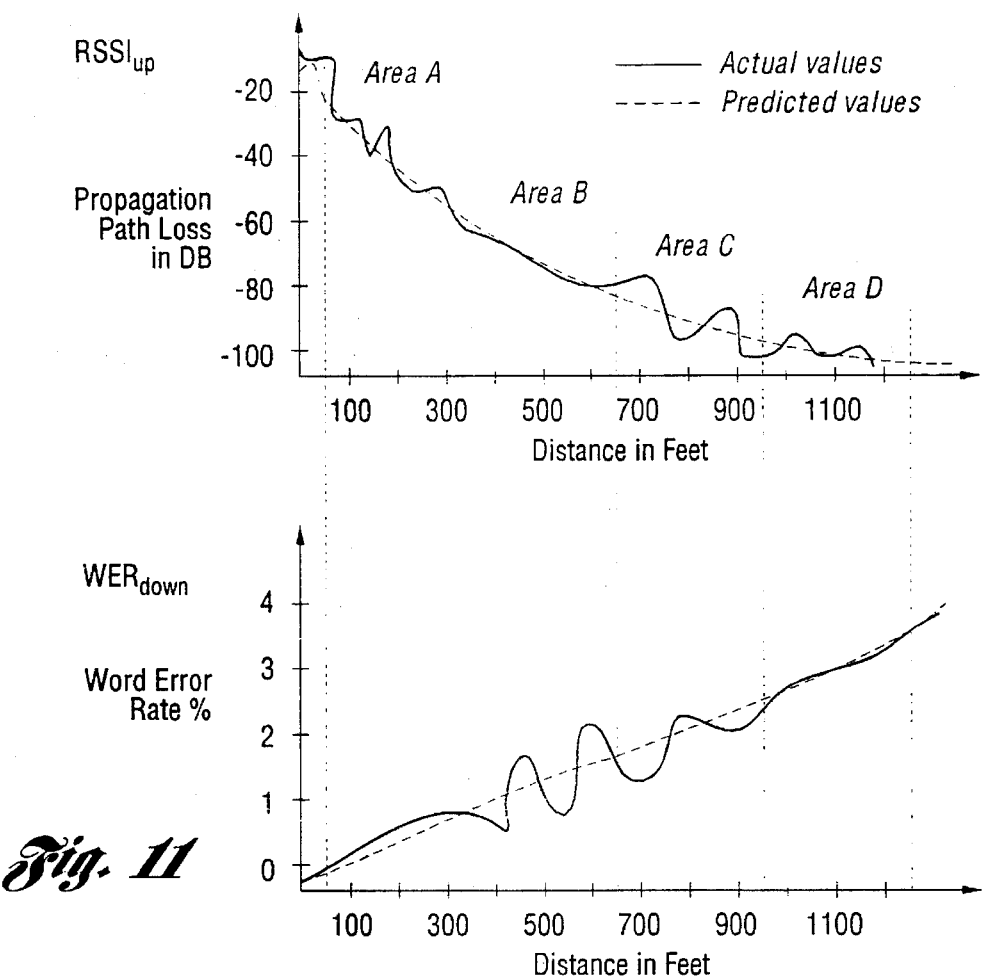
FIG. 11 is a representative curve fit graph obtained from the generic curve fit database used in accordance with the present invention.

This database is contemplated for use in accordance with the invention when no equipment-specific data is required/available. The generic curve fit database is created in the following manner:

1. Using the measurements database, load the data for each measurement type (i.e. $RSSI_{down}$), per an arc segment region, and per a base station, into a curve fitting program. One such program known to applicants is Table Curve 2D distributed by Jandel Scientific Software. Using any random or pseudo-random method, "holdback" 15% of the data points from the curve-fitting exercise, to be used as verification points later. This process will produce an equation for each measurement type, per region.
2. Inspect the resulting graphs for each measurement. Measurements that produce smooth, well-fit curves will be noted.
3. Simultaneously inspect all graphs for a given region. If one measurement produces a much smoother graph than the others, determining location in that region will require only one parameter. Alternatively, there may be areas within the region that correlate well with some measurements and poorly with others. As shown in FIG. 11, for example, it can be seen that the correlation in area A is fairly good for WER and poor for RSSI. Similarly, the correlation in area B is good for RSSI and poor for WER. These graphs suggest that determining location will require multiple parameters. In the example of FIG. 11, WER would be used in areas A and D, RSSI would be used in area B, and another measurement would be used in area C.
4. Test the equations by using the data points that were excluded from step 1. If the results are satisfactory, go on to the next step. If the error-bounds are too large using the existing equations, it may be necessary to use genetic algorithms to enhance the predictive technique for the region. Genetic algorithms could be used here to simultaneously combine the six (or more) equations in every conceivable manner to produce the best fit.
5. Store the equations for each region in the location database for use during a location request, along with the error estimate.

By analyzing the surrounding characteristics for each model region (i.e. street width, distance from base station to nearest building, etc.) along with a corresponding location equation, it may be possible to reuse this information in a predictive manner for future base station installations. Applicants contemplate that this could reduce costly manual RF measurement testing.

Bollinger Bands

As known to those skilled in the art, the basic idea behind Bollinger Bands is to read data points and create a moving average and a moving standard deviation. The bands are determined by calculating the average of a certain number of data points plus and minus two times the standard deviation of the data. A "sliding window" is used for the volatility of the data. The optimal window size will vary with the condition of the data.

Figure 12:
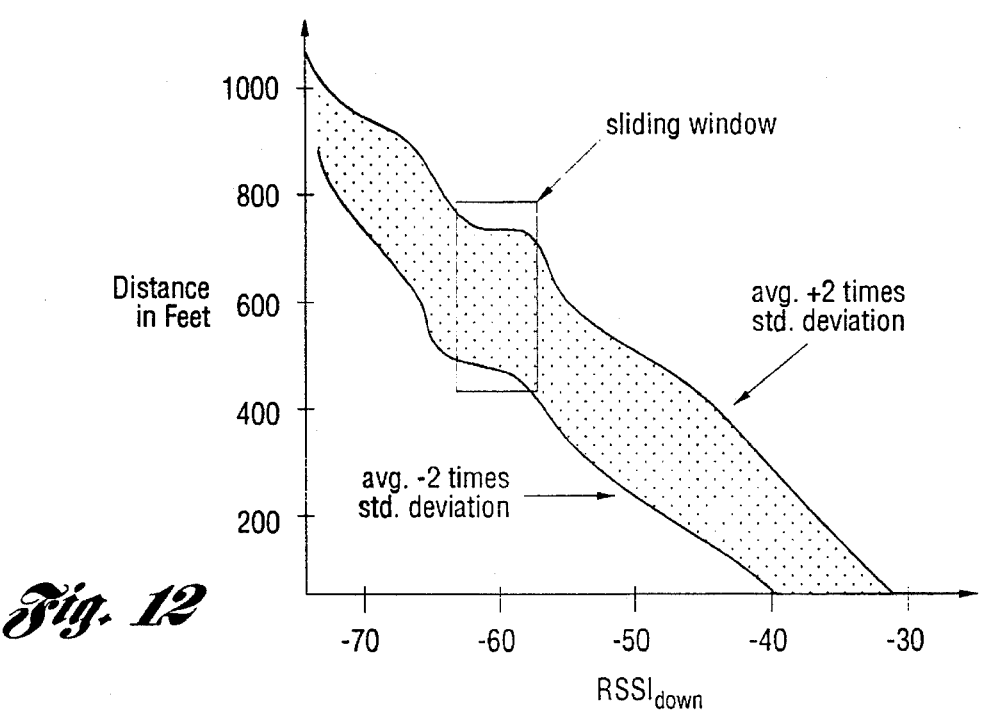
FIG. 12 is a schematic of typical data obtained when utilizing the Bollinger band database in accordance with the present invention.

As shown in FIG. 12, Bollinger Bands provide: (1) the ability to handle discontinuities and vast multi-model, noisy search spaces; and (2) they optimize error wherever possible, i.e., wherever field measurements have a low volatility, then Bollinger Bands will generally have a low bandwidth, which results in a more accurate bounding polygon.

In accordance with the present invention and as explained in further detail below, RF measurements will be analyzed using the Bollinger band technique in the following manner:

1. Load the data for each measurement type (i.e. RSSI downlink), per arc segment region, into a program to calculate the sliding window average and standard deviation.
2. For each distinct measurement value (e.g. −70 Db, −71 Db, −72 dB, etc.), store the measurement value and the corresponding average distance (in feet) in both the upper and lower band (in feet), based on the sliding window. Equipment-Specific Corrections Database This database is contemplated for use with the present invention if vendor-specific, and/or model-specific equipment characteristics are available and are used in the areas of interest, which deviate from the generic curve fit database assumptions. For example, in GSM, different vendors use slightly different mapping or transfer functions, in relating true Word Error Rate, with the vendor's quantized indicator. It is anticipated that public, open standards will be defined, that mitigate the need for the Equipment-Specific Corrections Database. Data for this database would normally be provided from lab tests performed by mobile unit manufacturers, which are then used for correction purposes with respect to the generic curve fit database, and its assumed internal baseline standard.

Run-Time Database

This database is contemplated by Applicants to be stored directly in the format of the GIS software being used (e.g. map info or ARC/info). It is derived from the data reduction processes, for example, the curve-fitting in Bollinger Band databases. Each arc segment per base station contains a number of entries. The first entry defines the independent variables used to calculate location within this arc segment. There is also one entry for each distinct measurement value of the independent variables selected (e.g. RSSI down=−70 dB, −71 dB, −72 dB, etc.) These entries are actually graphical objects (bounding polygons) that are selectable by the GIS software.

For example, with reference to FIG. 14 and the table below, assume the curve fitting in Bollinger Band analysis for base station 1 has determined that $RSSI_{up}$ is the best location predictor for arc segments 1, 2 and 3, while $WER_{down}$ is the best predictor for arc segments 4 and 5. The run-time database would contain the following entries:

| RUN-TIME DATABASE | |
| --- | --- |
| Arc Segment | Predictor Variable |
| 1 | $RSSI_{up}$ |
| 2 | $RSSI_{up}$ |
| 3 | $RSSI_{up}$ |
| 4 | $WER_{down}$ |
| 5 | $WER_{down}$ |

Figure 13:
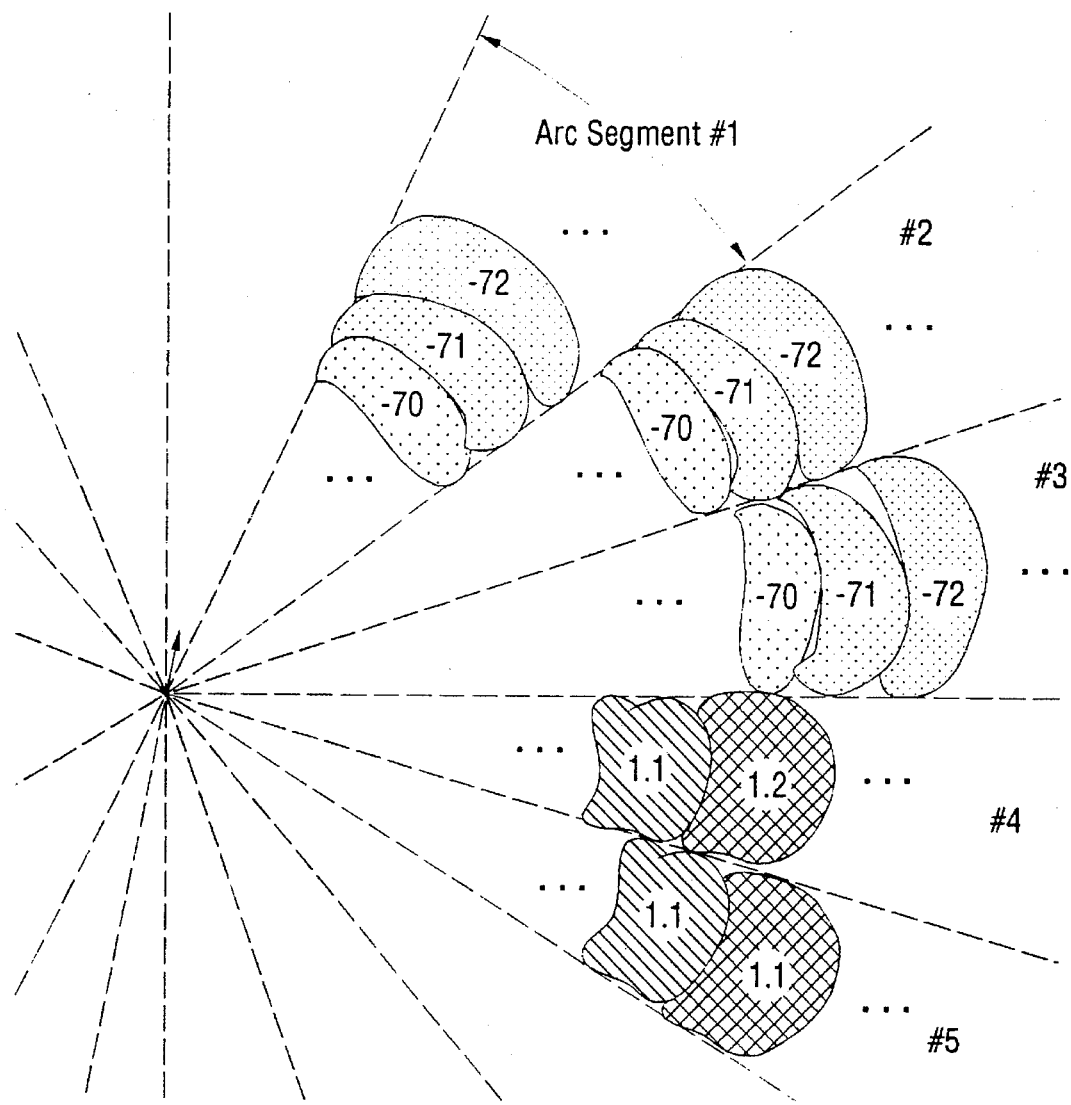
FIG. 13 is a schematic diagram of representative bounding polygons obtained by using a run-time database in accordance with the present invention.

In addition, the database would contain many bounding polygons per arc segment. FIG. 13 illustrates this concept for the five arc segments mentioned. In this figure, the bounding polygons for $RSSI_{up}$ values of −70 dB, −71 dB and −72 dB are displayed for arc segments 1–3. Additionally, the bounding polygons for WER down values of 1.1% and 1.2% are displayed for arc segments 4 and 5. While only 2–3 bounding polygons per arc segment are displayed in the figure, there would actually be many polygons to cover the entire range for variable being used.

The run-time database is displayed with one predictor variable per arc segment as shown above. The Position Location System (PLS) process will actually use more than one predictor variable per arc when a single variable does not reliably predict distance. The run-time database for each arc segment will be constructed by using the results of the curve fit and Bollinger band databases, and will actually consist of two tables. The first table will be used to construct a set of fuzzy logic rules, while the second table will provide a predicted distance value, along with a minimum and maximum boundary.

For example, if arc segment 1 of radio port 5 is predicted well by $RSSI_{down}$ for values of −40 dB to −70 dB, and $WER_{down}$ for values of 1% to 3%, the following entries would appear in the run-time database rule table:

TABLE 1

Run-Time Database Rule Table

| Radio Port | Arc Segment | Variable | Min Range | Max Range |
|---|---|---|---|---|
| 5 | 1 | $RSSI_{down}$ | −40 | −70 |
| 5 | 1 | $WER_{down}$ | 1.0 | 3.0 |

The second table for arc segment one would contain entries such as these:

TABLE 2

Run-Time Database Values Table

| Radio Port | Arc Segment | Variable | Value | Mean Dist | Min Dist | Max Dist |
|---|---|---|---|---|---|---|
| 5 | 1 | $RSSI_{down}$ | −40 | 100 | 0 | 200 |
| 5 | 1 | $RSSI_{down}$ | −41 | 120 | 20 | 220 |
| 5 | 1 | $RSSI_{down}$ | ... | ... | ... | ... |
| 5 | 1 | $RSSI_{down}$ | −70 | 500 | 400 | 600 |
| 5 | 1 | $WER_{down}$ | 1.0 | 400 | 350 | 450 |
| 5 | 1 | $WER_{down}$ | 1.1 | 440 | 390 | 490 |
| 5 | 1 | $WER_{down}$ | ... | ... | ... | ... |
| 5 | 1 | $WER_{down}$ | 3.0 | 800 | 700 | 900 |

During a location request, the LAP would access the run-time database rules table and construct the following code to determine the caller's predicted distance from radio port 5 for arc segment 1:

```
Pseudo-code:

rule_1 = FALSE
rule_2 = FALSE
/* look for active rules */
if −70 <= RSSI_down <= −40 then
    rule_1 = TRUE
if 1.0 <= WER_down <= 3.0 then
    rule_2 = TRUE
if rule_1 is TRUE and rule_2 is TRUE
    /* both rules apply, so we have to perform a weighted
       average using the difference between predicted max
       and min */
    weight_1 = (RSSI_down max−RSSI_down min) /
                (RSSI_down max−RSSI_down min+
                 WER_down max−WER_down mean)
    weight_2 = (WER_down max−WER_down min) /
                (RSSI_down max−RSSI_down min+
                 WER_down max−WER_down mean)
    /* reverse the weights because the one with the smaller
       difference is better and should be weighted more
       heavily */
    mean = weight_1*WER_down mean + weight_2*RSSI_down
           mean
    min = weight_1*WER_down min + weight_2*RSSI_down min
    max = weight_1*WER_down max + weight_2*RSSI_down max
else if rule_1 is TRUE
    use RSSI_down mean, min and max
else
    use WER_down mean, min and max
```

The detailed steps of preparing the run-time database and thus the PCS location databand may be illustrated with reference to FIG. 14 of the drawings. FIG. 14 is a schematic diagram of a Radio Port that has arc-segments 120 of 6 degrees. The arc-segments create discrete sections of the area around the Radio Port. With these sections clearly defined, the RF behavior of the Radio Port can be characterized in each section independently. After the locations have been partitioned into arc-segments, a spreadsheet file can be produced for each arc-segment.

The preparation steps include the initial gathering of field data. The desired parameters ($RSSI_{up}$, $RSSI_{down}$, $WER_{up}$, $WER_{down}$, $QI_{up}$, $QI_{down}$, etc.) will be collected at locations surrounding the Radio Ports. In a preferred embodiment, these locations will be approximately 10 meters apart from one another. All measurements will be placed with location tags in a suitable spreadsheet file such as, for example, Microsoft Excel.

The locations will thereafter be partitioned into arc segments 120 as indicated above. In keeping with the invention, the locations need to be partitioned into arc segments 120 in order to accurately model the parameters around corresponding Radio Ports. After the data has been collected and partitioned into arc segments, a suitable curve fitting program such as TableCurve 2 D will be used to curve-fit the data (distance versus each parameter) for each individual arc-segment. The software generates a list of functions that could possibly characterize the data and sorts the functions (best to worse) by means of lowest Fit Standard Error (FitStdErr).

Sometimes, the best fit (lowest FitStdErr) that the curve-fitting software packages produces is not the best fit for the RF data. There are many different examples of the software package fitting a curve to the data that is not physical (not possible in the RF environment). Some examples of non-physical fits are fits that swing into negative distances, fits that have high sinusoidal content, and fits that have many slope reversals or large swings in areas where few or no actual data points reside.

Figure 15:
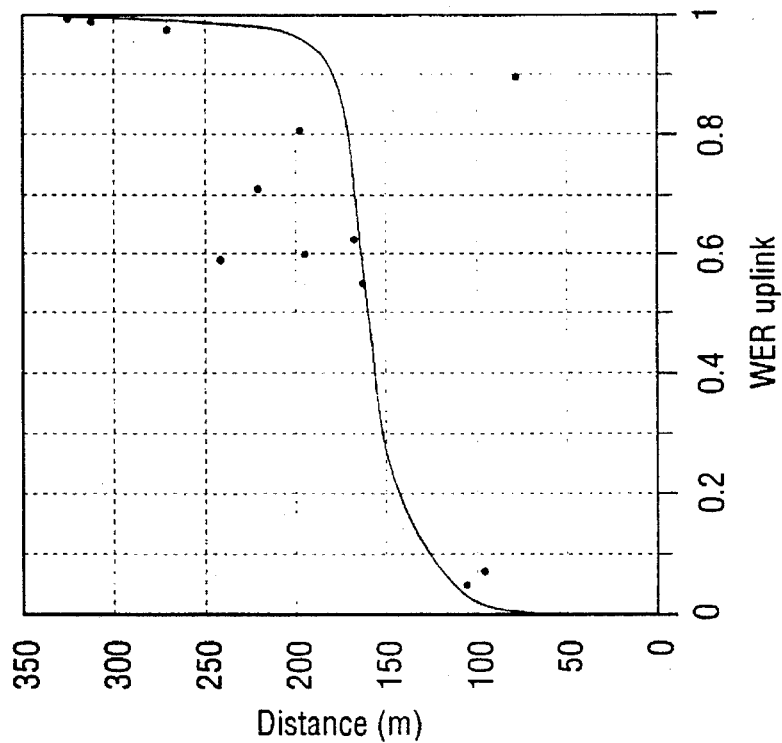
FIG. 15 is a schematic diagram of a first sample curve fit plot before and after a manual search.
Figure 15:
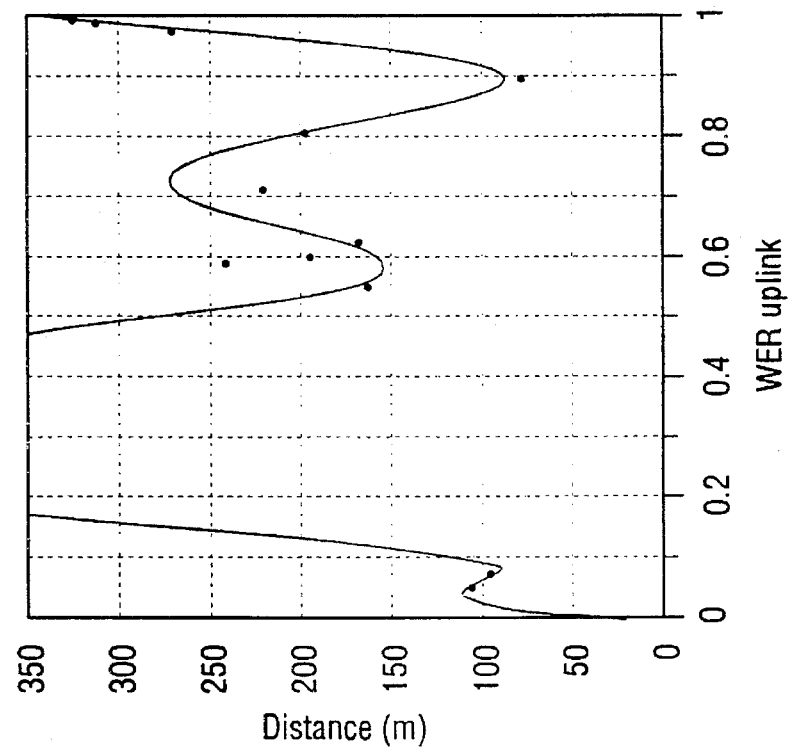

FIG. 15 illustrates two TableCurve 2D curve-fit on the same data. The plot on the left shows the curve-fit that the software package chose as the best fit (it is the fit with the lowest FitStdErr). One skilled in the art would recognize that the plot on the left is highly unlikely to be representative of the data because of the large swings where few data points lie. With the data from FIG. 15, a manual search for the most logical fit is needed. One skilled in the art would therefore search the fits until she found a fit that is more logical (like the fit on the right in FIG. 15).

Figure 16:
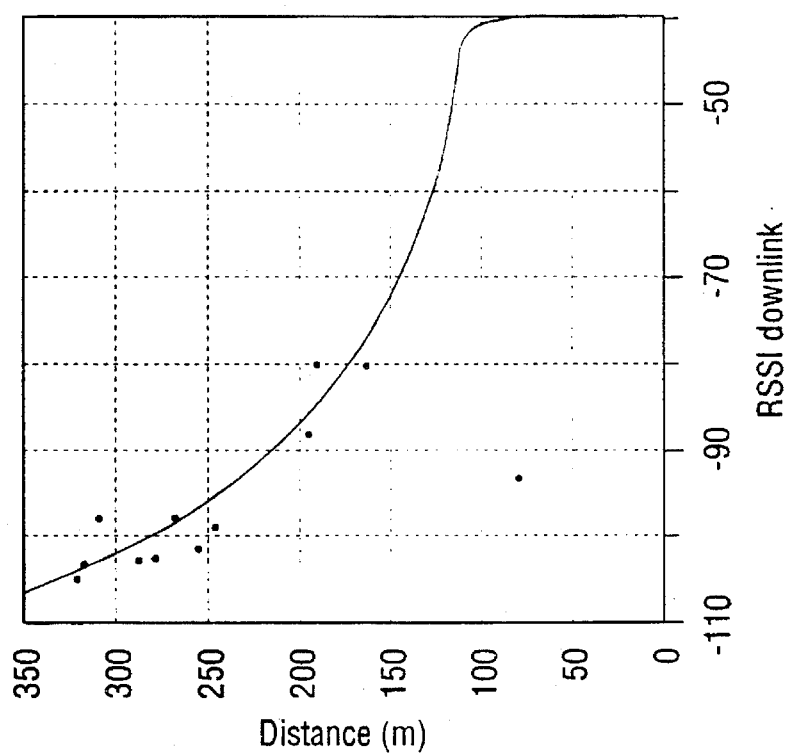
FIG. 16 is a schematic diagram of a second sample curve fit data plot before and after a manual search.
Figure 16:
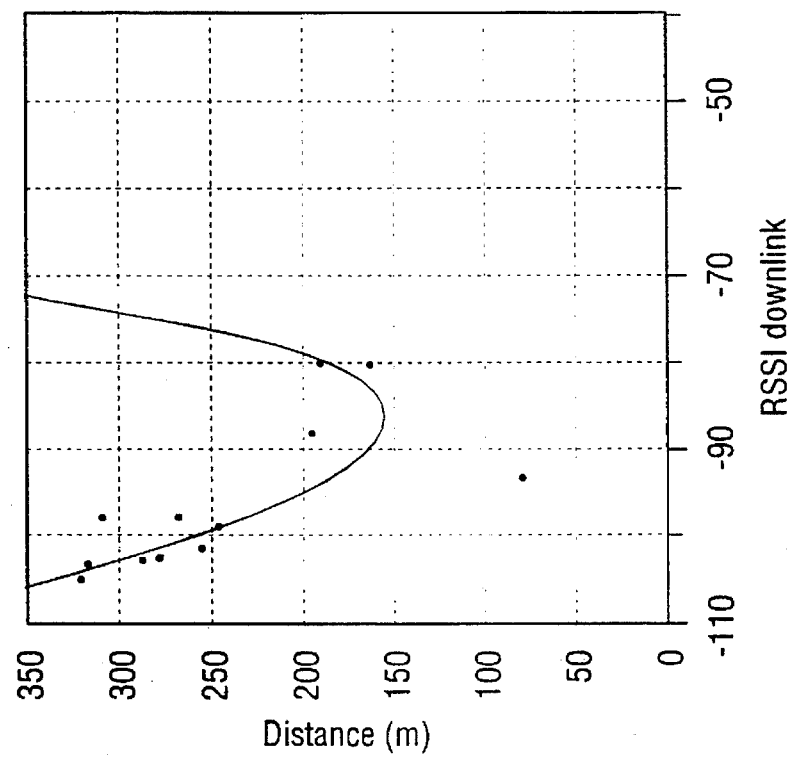

FIG. 16 provides another example of a TableCurve 2D fit that is not logical. The fit on the left has one swing to a very large distance (off of the top of the plot) in an area where there are no data points. The plot on the right is much more likely to describe the data accurately in the area where there are no data points, even though it has a higher FitStdErr than the plot on the left.

Figure 17:
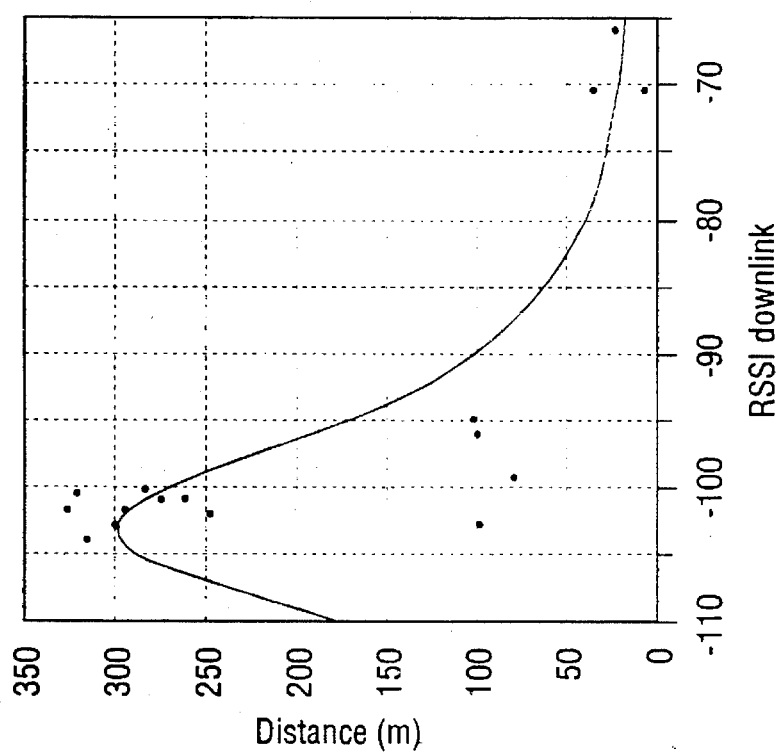
FIG. 17 is a schematic diagram of a third sample curve fit data plot before and after a manual search.

FIG. 17 illustrates yet another fit (left) that has a large negative distance swing (again, where no data points lie) and a sharp, large positive distance swing. In keeping with the invention, negative distances are not valid because they do not represent the RF environment properly. The sharp, large distance swing is not reliable because of the low number of data points in the area. The plot on the right has a much higher probability of being accurate.

Figure 18:
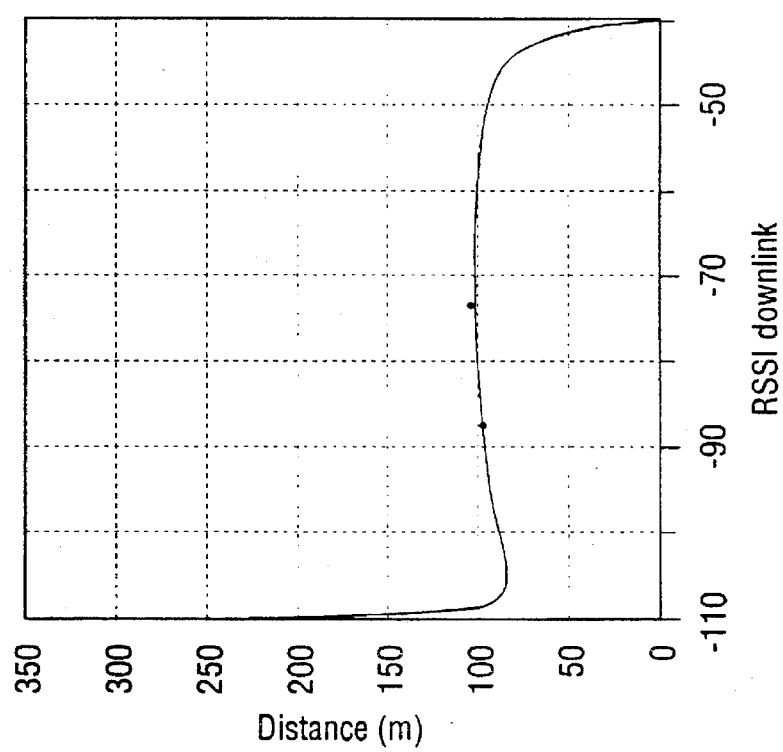
FIG. 18 is a schematic diagram of a fourth sample curve fit data plot before and after a manual search.
Figure 18:
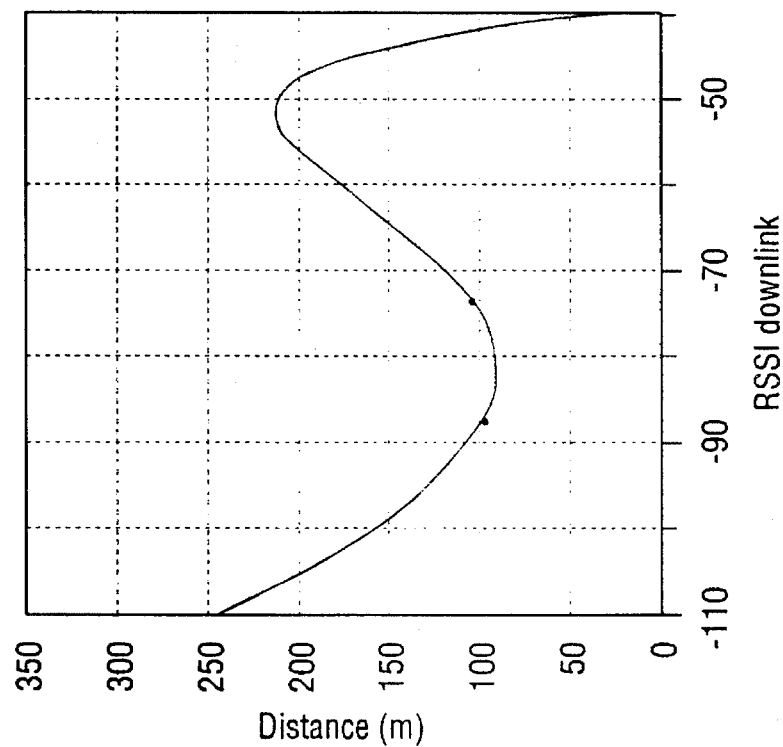

The lowest FitStdErr fit in FIG. 18 displays a more subtle problem. The points along the distance axis (vertical) are not well represented, yet they make up the majority of the data point population. The plot on the right better represents those data and also eliminates questionable swings that are in the left plot.

Although manually searching for the most logical fit may result in a larger FitStdErr, the fit will also be more representative of the actual RF environment. The number of invalid fits by TableCurve 2D, for example, can be minimized by collecting a high number (50–60) of evenly spaced data points within each arc-segment.

Figure 19:
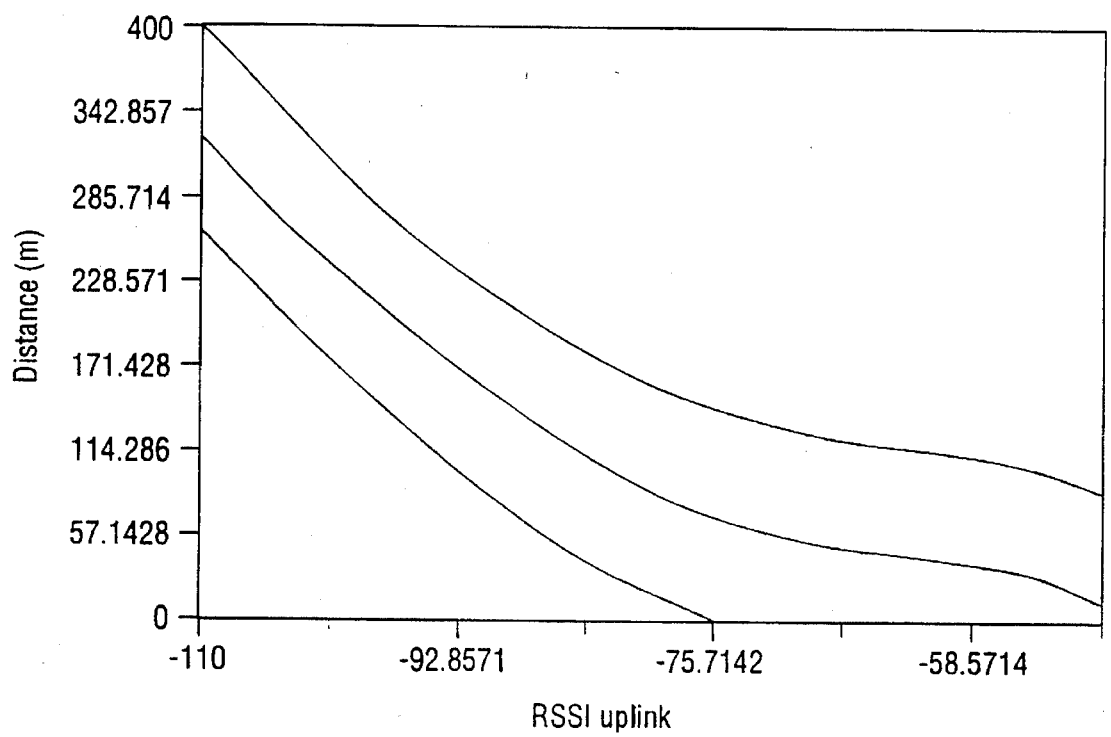
FIG. 19 is a schematic diagram of a best fit confidence interval with maximum and minimum bands.

After the curve fitting program produces a valid fit, 95% confidence intervals (or bands) can be created. These bands (minimum and maximum) are produced by adding and subtracting twice the FitStdErr to the average fit. Any negative distances will be eliminated from the band. FIG. 19 shows a best fit with maximum and minimum confidence bands. It should be noted that through simple numeric integration, the area of the interval can be computed. The area of the band will describe how volatile the data is throughout a complete arc-segment.

Figure 20:
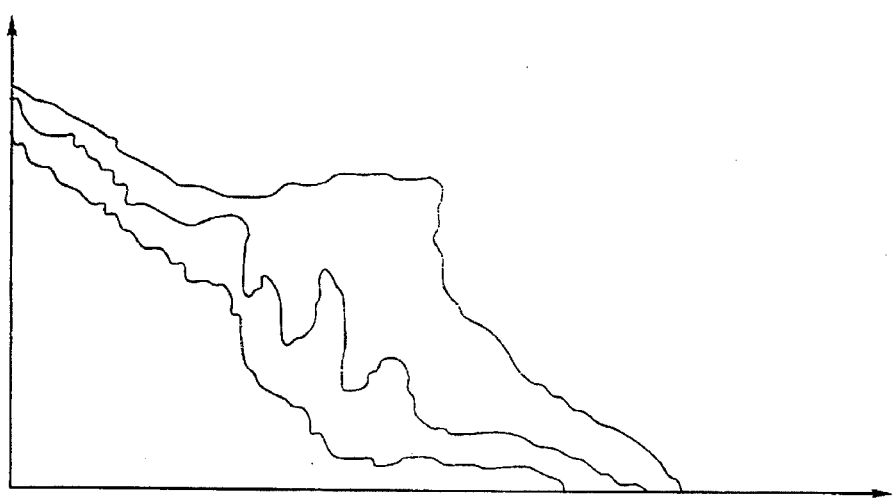
FIG. 20 is a schematic diagram of a representative Bollinger band.

After the confidence intervals have been determined, Bollinger bands can be created for the data in each arc-segment 120. As indicated above, Bollinger bands are similar to the confidence intervals in that they represent a range in which data points are likely to reside. However, Bollinger bands widen according to the volatility of the data in a certain area of a particular arc-segment. Basically, the Bollinger interval is wide in areas where the deviation of the data points is large, and is narrow in areas where the deviation of the data points is small. FIG. 20 shows how Bollinger bands widen in areas of data volatility.

As discussed above, Bollinger bands use a "sliding window" technique to compute a moving average across a data set. The sliding window size for location purposes will be 20% of the data population for each arc-segment. As with confidence intervals, the area of the Bollinger bands can be computed through simple numeric integration. The advantage of the Bollinger band over the confidence interval is that the area of the Bollinger band in a discrete section of an arc-segment can describe the volatility of the data in that section. The area of the confidence interval can only describe the volatility of the data throughout a complete arc-segment.

A problem with Bollinger bands is that they have a phase lag that is introduced in calculating the moving average. Because of this phase lag, the Bollinger band widens slightly beyond the volatile data. The amount of phase lag is dependent on the size of the sliding window.

Figure 21:
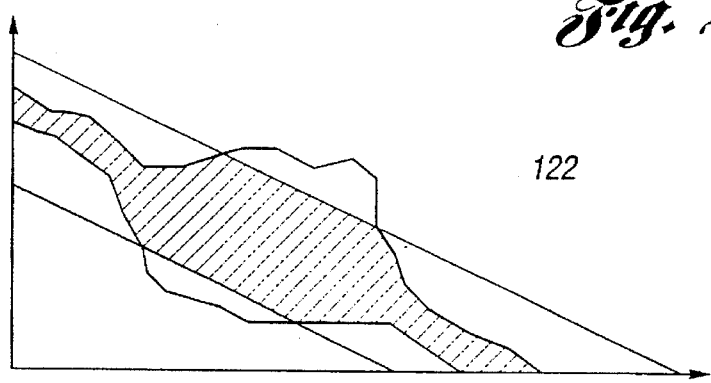
FIG. 21 is a schematic diagram of a location band.

To "clip" the phase lag, the Bollinger band and confidence intervals can be intersected. The intersection of these two bands becomes the location or distance band 122, as shown in FIG. 21. The location band 122 is what will be used to generate (for the location databank) minimum and maximum distances for any valid values of any of the parameters. The area of the location band 122 can be computed with simple numeric integration and is an indication of the data volatility.

At this stage, location bands have been produced for all parameters in each arc-segment. Now, a method of determining which parameters to use is needed. Fuzzy logic will be used to determine which parameters will be used when estimating a distance. Fuzzy logic, as known to those skilled in the art, consists of fuzzy patches or rules which try to explain the behavior of fuzzy systems. Fuzzy patches or rules are simply if-then-else statements that describe a discrete section of the system's output. The goal is to have a group of fuzzy patches that accurately describe the system's complete output. In this location system, fuzzy rules will be created to use the parameters with the least volatility to estimate a distance.

Figure 22:
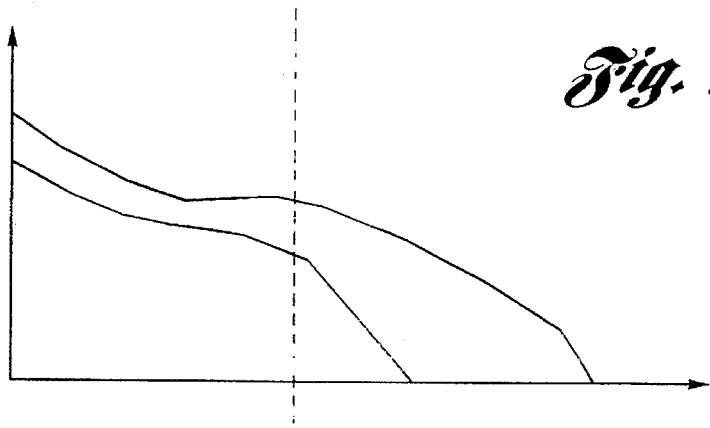
FIGS. 22–23 provide representative schematics of $RSSI_{downlink}$ and $WER_{uplink}$.
Figure 23:
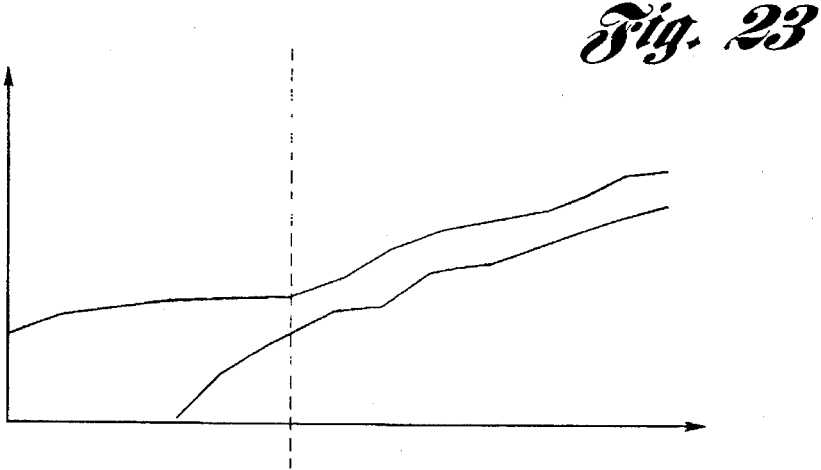

FIGS. 22 and 23 provide examples of two different parameters from the same arc-segment. An example of a fuzzy rule would be as follows: If $RSSI_{downlink}$ reading lies in the range to the left of the dashed line, use $RSSI_{downlink}$. Otherwise, use $WER_{uplink}$.

The above fuzzy rule is an over-simplified case, yet it illustrates the idea behind fuzzy logic. With all parameters being used, weighted averaging can be used to implement a combination of parameters in the fuzzy model. Fuzzy logic is flexible in allowing different parameters to carry different weights. In the location system of the present invention, the weights for the fuzzy logic averaging will be determined by the volatility of the data (used the measure of the location band area). In the "gray" areas of overlapping fuzzy rules, the overlapping rules are added together (with associated weights) and then the average of the curve will be used.

By preparing several individual parameter bands to get the smallest volatility within a "quantization", the best solution may be determined. Finally, the final solution may be compiled using fuzzy logic technique values. For example, in the pseudo code above, each of the database entries is weighted against one another such that the database entry of minimum volatility having the strongest predictor of distance at a particular location for particular values is obtained where more than one rule applies.

As known to those skilled in the art, fuzzy logic is a process where, unlike neural networks, more than one rule applies. The rules are averages in a predetermined weighting scheme. Unlike normal fuzzy logic rules, however, the weighting here pertains to minimum and maximum values. In keeping with the invention, volatility is used as an indicator of the best weight. The variable with the least volatility is weighted the most, however, other variables are not discounted.

In this manner, overlapping RF measurements may be utilized. Thus, 80% of WER and 20% of RSSI might be used in predicting location. The system and method of the present invention averages the minimum distances as well as the maximum distances which then become the min and max boundaries for each arc segment. This process is repeated for all other arc segments which permit a min and max bounding polygon to be drawn around a Radio Port. The process is thereafter repeated for neighboring Radio Ports as they are "heard" to determine the most accurate predicted bounding contours for the other neighboring Radio Ports. The resulting contours (i.e. the minimum and maximum contours) are thereafter drawn around each Radio Port, the intersections of which define the bounding polygon where the mobile unit can be located.

Because the Radio Port data is partitioned into separate arc-segments and then analyzed, there will be discrete jumps in the data between arc-segments. To improve the continuity of the data between arc-segments, a line will be added to help smooth the jumps. The slope of this line will roughly be the magnitude of the jump divided by some $\Delta X$ (where $\Delta X$ is 10–20% of the width of the arc-segment).

Figure 14:
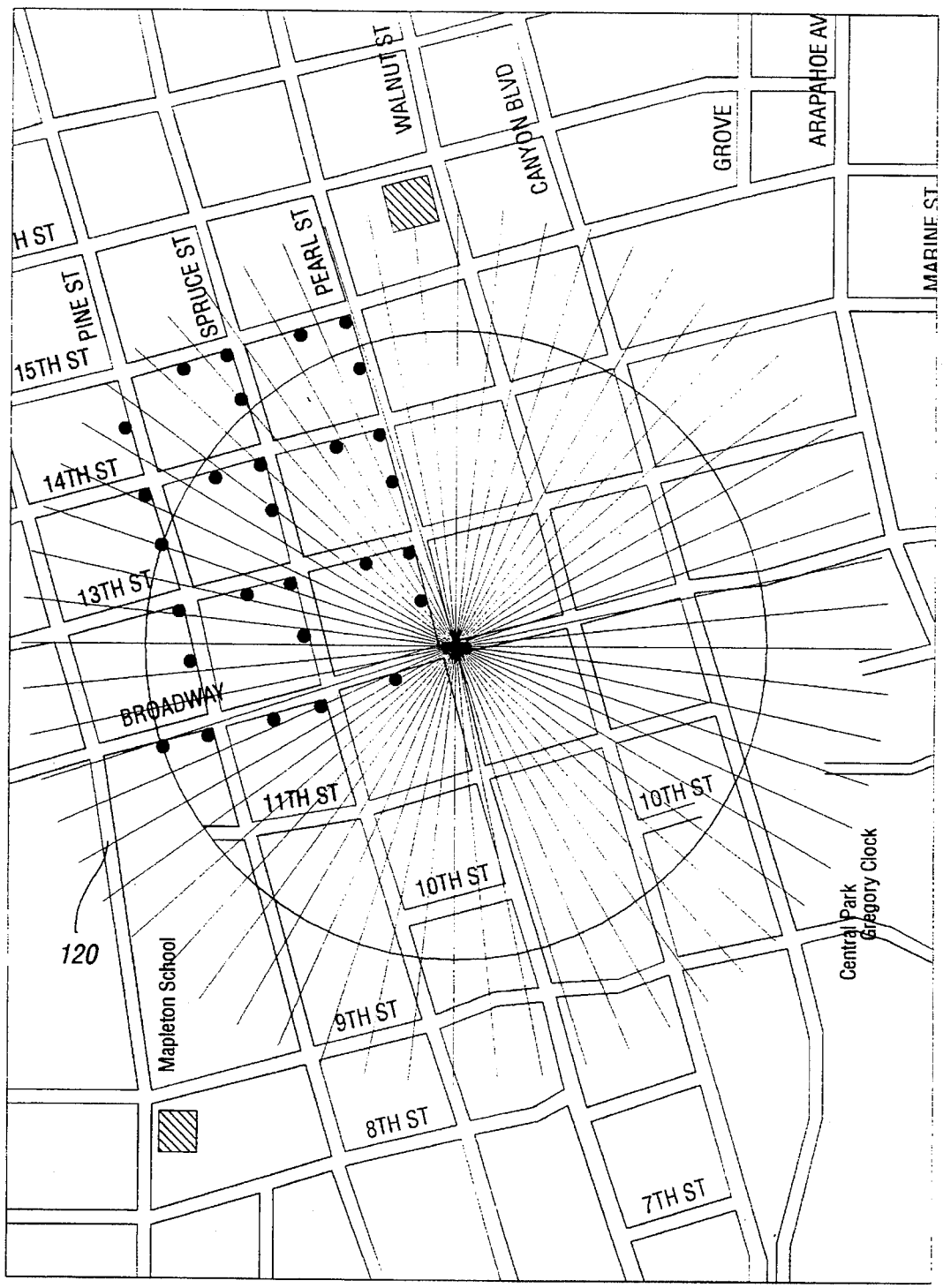
FIG. 14 is a schematic diagram of representative arc segments drawn around a Radio Port.

In keeping with the invention, the step of modeling the determined RF measurements as scaled contour shapes therefore requires segmenting the coverage areas of each of the base stations into a plurality of arc segments designated by reference numeral 120 in FIG. 14. For each of the arc segments 120, a plurality of single or multiple regressions must be performed so as to convert actual data into a corresponding plurality of mathematical curve-fit equations each representing a relationship between a predetermined measurable variable, i.e. RSSI, WER, etc. and distance from the base station. For each of the arc segments, the degree of fit must be determined of the corresponding mathematical equation by comparing each of the mathematical equations with actual data. The mathematical equations may thereafter be optimized by determining which has the best correlation and least standard error for a predetermined portion of each arc segment 120.

In an alternative embodiment, a Genetic Algorithm (GA) may be used to optimize the parameters of each of the single or multiple regressions so as to further improve the degree of fit for greater correlation and minimum standard error. Still further, in cases where there is generally poor correlation between all of the mathematical equations of an arc segment and the actual data, the corresponding base station may be instructed along with the receiver, i.e., the mobile unit, to each temporarily change their transmission frequencies by 10–40 MHz. Thereafter, additional RF measurements may be obtained for the base station at the changed frequency, including its link budget, for the same predetermined plurality of distances and directions. As readily seen, this will increase the number of variables for consideration and analysis.

Figure 24:
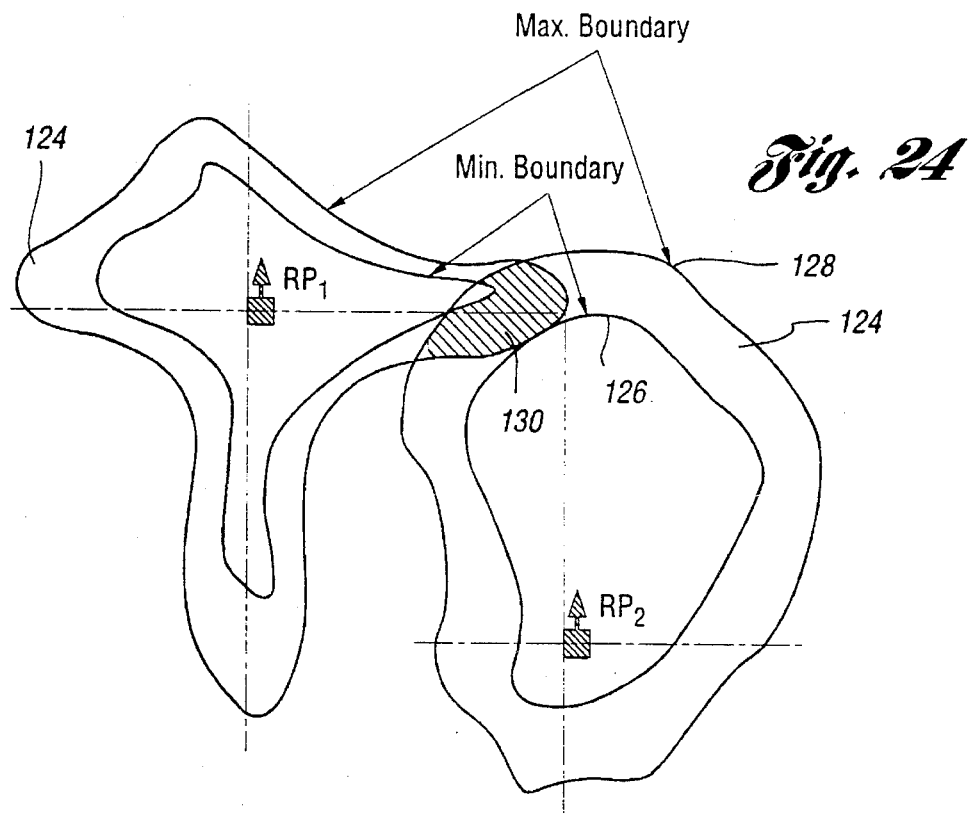
FIG. 24 is a schematic diagram of a first location polygon obtained in accordance with the present invention.

The optimized mathematical equations for each arc segment are thereafter combined so as to form the scaled contours 124 such as that shown in the schematic of FIG. 24.

Each scaled contour 124 has minimum and maximum bounds 126 and 128. After these boundaries have been determined for an entire base station, minimum/maximum boundaries also define minimum/maximum contours, based on a given set of real-time measurements in both the uplink and downlink directions. This process is repeated for neighboring base stations, and the resulting intersection (if any) then define a first min/max bounding polygon 130.

Figure 26:
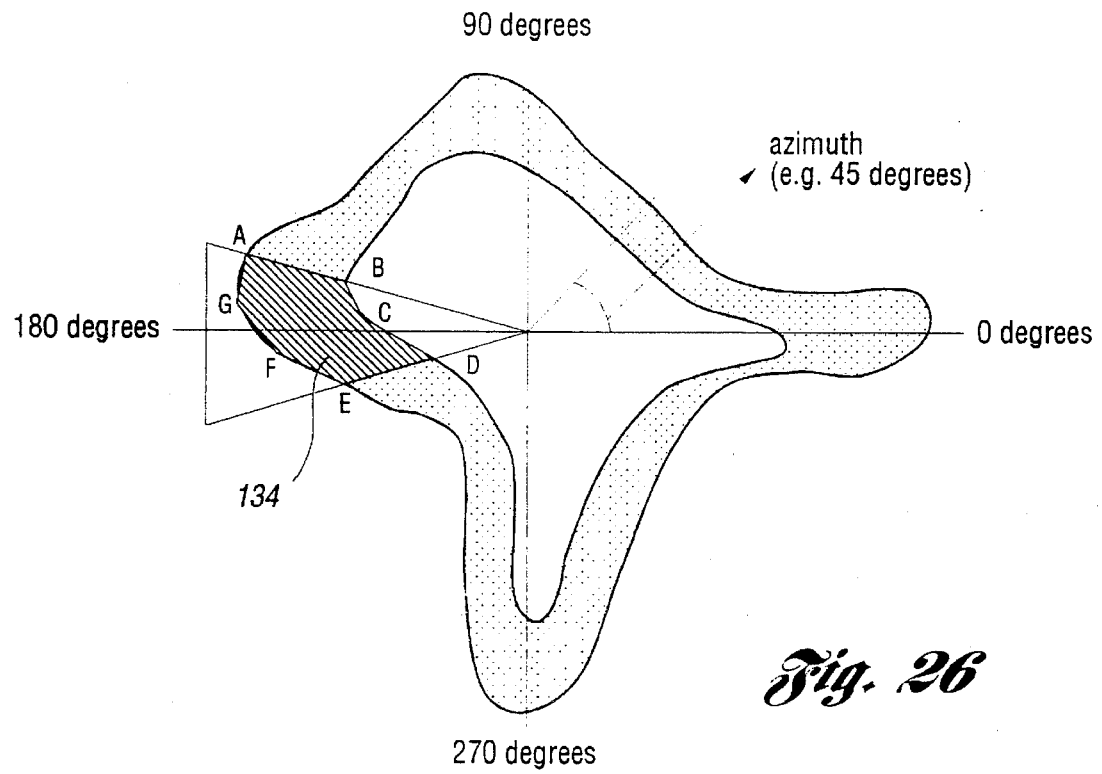
FIGS. 26–27 are schematic diagrams of the intersection of first and second bounding polygon areas.
Figure 27:
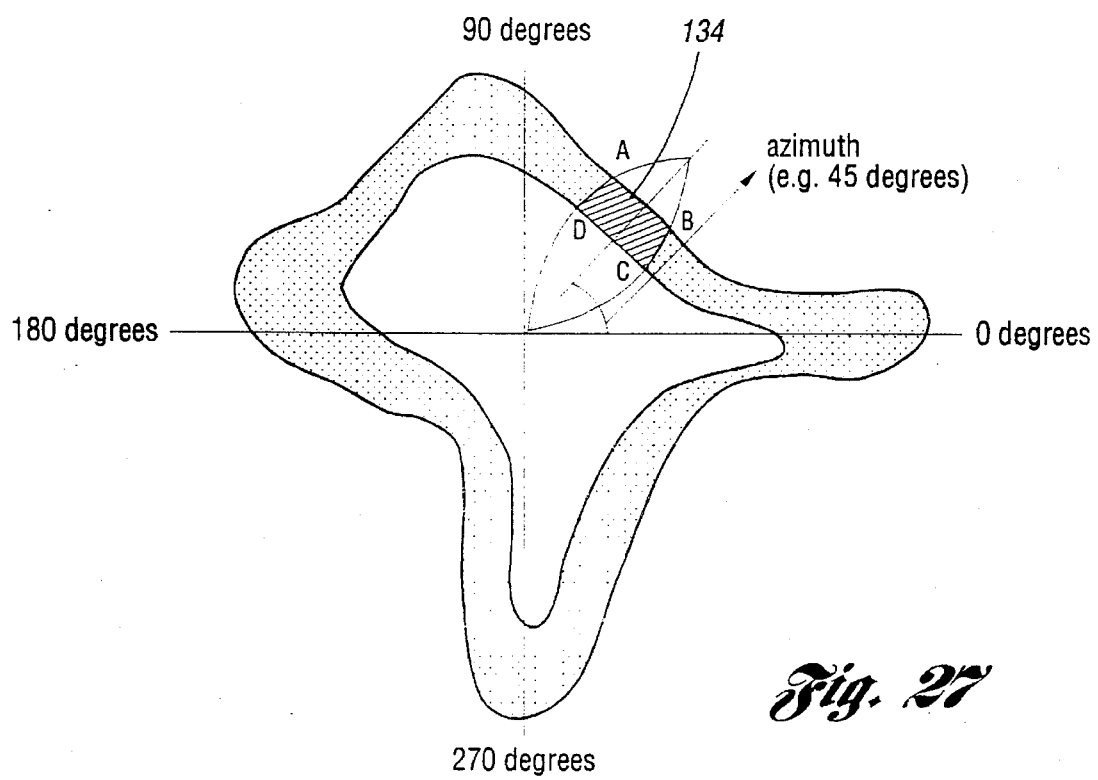
Figure 28:
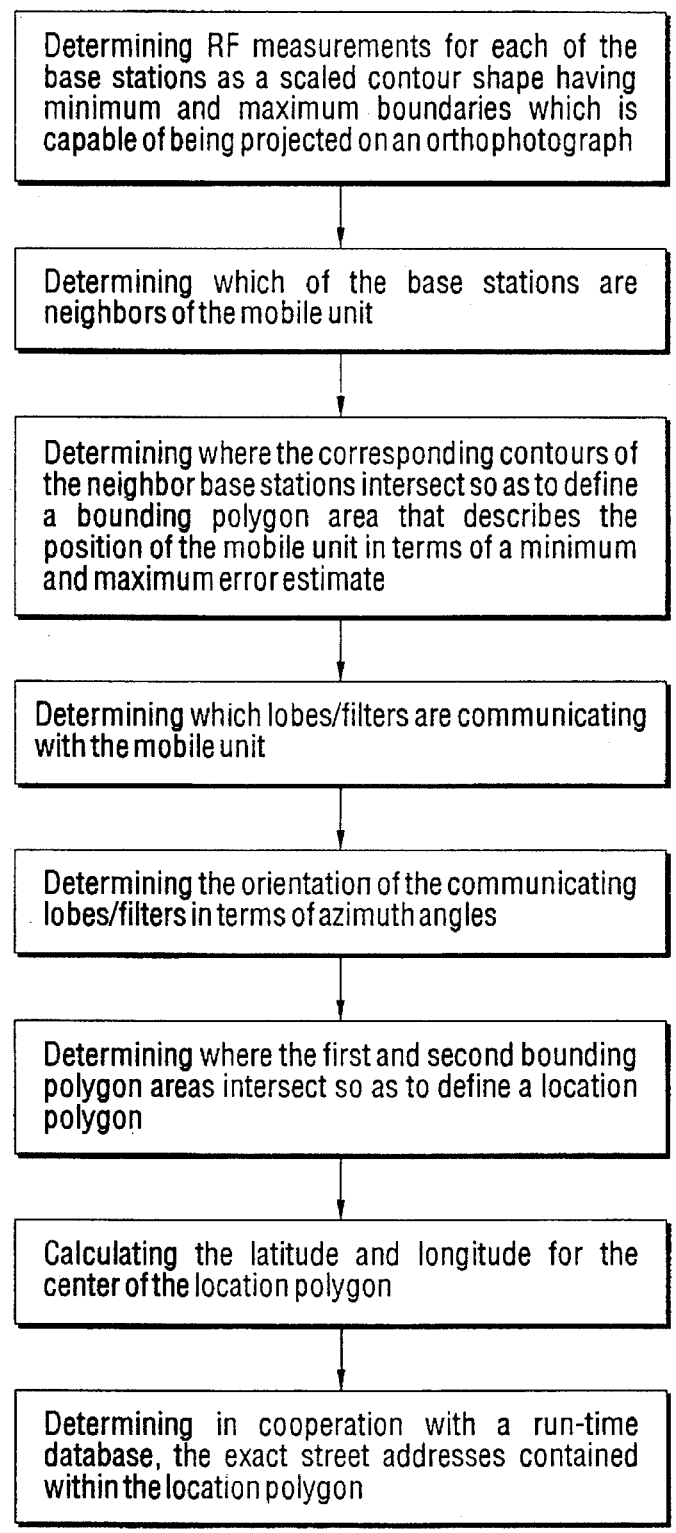
FIG. 28 is a block diagram of the method steps of the present invention.

It must thereafter be determined which lobes or bandpass filters are communicating with the mobile unit 94. Next, the orientation of the communicating lobes/bandpass filters must be determined in terms of azimuth angles so as to define a second bounding polygon area 132 similar to that shown, for example, in FIG. 25. Finally, by determining where the first and second bounding polygon areas intersect, a location polygon 134 may be defined, as shown in FIGS. 26–27, which more precisely describe the position of the mobile unit 94 in terms of minimum and maximum error estimate. Once the location polygon 134 has been defined, its center may be calculated in terms of latitude and longitude. Finally, the exact street addresses contained with the location polygon area may be determined in cooperation with a run-time database. A flow chart of the method steps is provided in FIG. 28.

Figure 25:
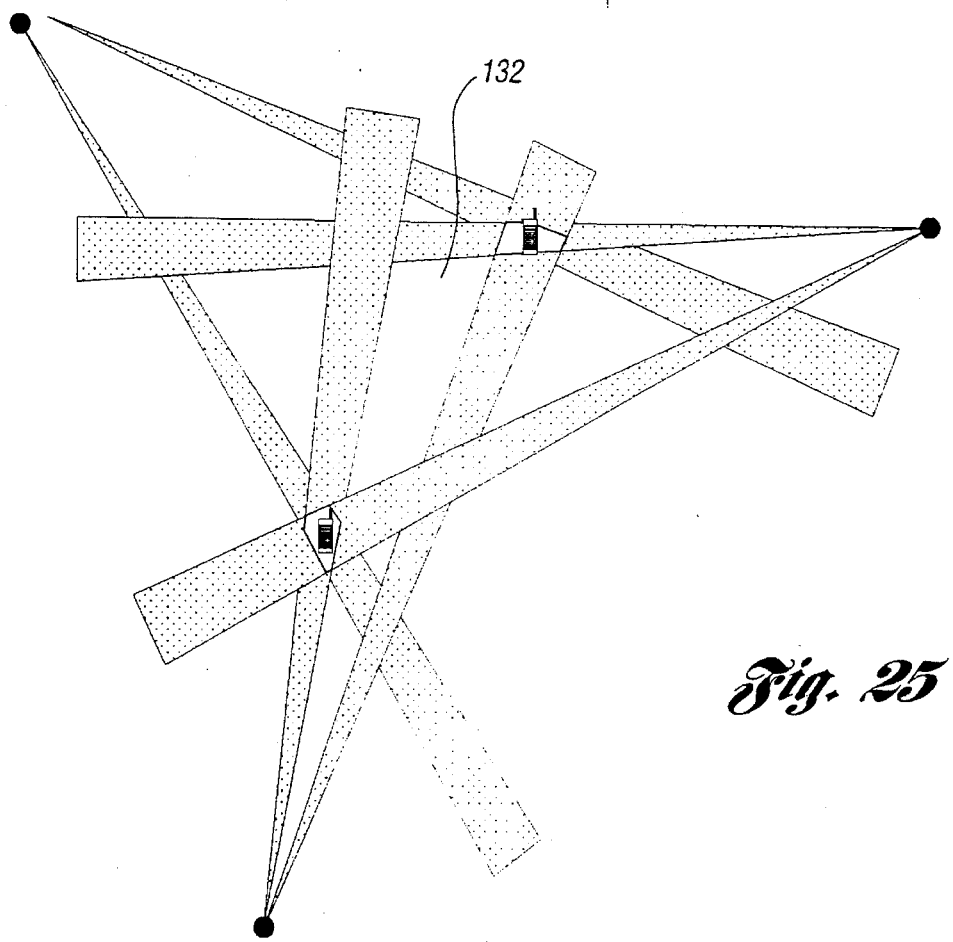
FIG. 25 is a schematic diagram of a second bounding polygon area formed by the determined azimuth angles of the communicating lobes of neighboring base stations.

FIG. 25 of the drawings depicts a system with 3 SDMA-equipped base stations, simultaneously providing location estimates for two E-911 users. In normal operation, a caller is served by a single base station as in conventional systems. Upon detection of an incoming call, however, network-level software instructs the serving base station along with its surrounding base stations to supply estimates of the callers (E-911) relative azimuths. These azimuth estimates can then be combined with the known locations of the base stations to produce an estimate of the caller's position, i.e. to provide the second bounding polygon area referenced above.

As known to those skilled in the art, common frequency planning strategies deliberately assign distinct channels to neighboring base stations. SDMA base stations, however, are typically equipped with frequency agile multi-channel receivers that can rapidly tune to any of the frequencies in use by the system. An SDMA-equipped base station can thereby provide a location estimate for an adjacent base station's user. In contrast, conventional base stations typically have a single-channel receiver for each of the frequencies in which they operate, and are therefore incapable of monitoring an adjacent base station's channels.

SDMA-equipped base stations also have the ability to accurately locate a mobile unit even though the signal received by the base station may be too weak to be successively demodulated. This ability to accurately locate weak signals is inherent in the advanced signal processing techniques employed at SDMA-equipped base stations.

To provide a realistic numerical example, suppose that the accuracy of each base station's azimuth estimate is plus or minus 0.3°, and that the three base stations depicted in FIG. 12 lie on the vertices of an equilateral triangle which is 10 km on a side (i.e. a nominal 5 km range for each base station). The maximum distance that a caller inside of the triangle could be from any one of the base stations is then 10 km, and the associated position estimate would cover an area of roughly 0.008 km$^2$ (corresponding to a horizontal position uncertainty of roughly 0.1 km or 100 m). The uncertainty is reduced by a factor of nearly 400 from the TDMA example provided above.

Where a smart antenna having floating lobes is utilized, it is understood that each of the lobes is operative to track and communicate with the mobile unit on a corresponding communication channel by changing its orientation within a predetermined direction range. Thus, after the first bounding polygon area 130 has been determined, it must further be determined which lobes of the neighboring base stations are in communication with the mobile unit 94. Armed with this information, the orientation ranges of the communicating lobes of the neighboring base stations may thereafter be determined in terms of azimuth angles so as to define the second bounding polygon area 132 that describes the relative position of the mobile unit. As above, it may thereafter be determined where the first and second polygon areas intersect so as to define a location polygon 134, as shown in FIGS. 26 and 27, which describes the position of the mobile unit in terms of minimum and maximum error estimate.

FIG. 26 illustrates the location polygon 134 formed by the intersection of the first bounding polygon area 130 obtained from RF measurements and a second bounding polygon area 132 obtained from bidirectional measurements from a smart antenna lobe. As indicated above, directional information (azimuth) is obtained to determine where the lobe is centered. The intersection of the lobe coverage and the contour is where the mobile unit is located. Thus, for the example shown of an SDMA-equipped base station, the area around 45° (specifically, 45° plus or minus half the width of the lobe) is the location of the mobile unit.

FIG. 27 illustrates a similar location polygon this time formed by the intersection of the contour and the reception angle of a bandpass filter. Again, the intersection area, in the example of a directed bandpass filter, is approximately 180° (specifically 180° plus or minus half the reception angle of the bandpass filter).

While the best modes for carrying out the invention have been described in detail, those familiar with the art to which this invention relates will recognize various alternative designs and embodiments for practicing the invention as defined by the following claims.

What is claimed is:

1. For use in a wireless communication system including a plurality of Spatial Division Multiple Access (SDMA)-equipped base stations each having a smart antenna with a predetermined number of fixed lobes, each of the lobes oriented in a predetermined direction and operative to communicate with a mobile unit on a corresponding communication channel within a known coverage area, a method for determining the position of a mobile unit, comprising:

for each of the base stations, determining in cooperation with a receiver, a plurality of RF measurements for the base station, for a predetermined plurality of distances and directions;

for each of the base stations, modeling its determined RF measurements as a scaled contour shape having minimum and maximum boundaries;

determining where the contour shapes of the neighboring base stations intersect so as to define a first bounding polygon area that describes the relative position of the mobile unit;

determining which lobes of the neighboring base stations are in communication with the mobile unit;

determining the orientations of the communicating lobes of the neighboring base stations in terms of azimuth angles so as to define a second bounding polygon area that describes the relative position of the mobile unit; and determining where the first and second bounding polygon areas intersect so as to define a location polygon that describes the position of the mobile unit in terms of minimum and maximum error estimate.

2. For use in a wireless communication system including a plurality of Spatial Division Multiple Access (SDMA)-equipped base stations each having a smart antenna with a predetermined number of floating lobes, each of the lobes operative to track and communicate with a mobile unit on a corresponding communication channel by changing its orientation within a predetermined direction range, a method for determining the position of a mobile unit, comprising:

for each of the base stations, determining in cooperation with a receiver, a plurality of RF measurements for the base station, for a predetermined plurality of distances and directions;

for each of the base stations, modeling its determined RF measurements as a scaled contour shape having minimum and maximum boundaries;

determining where the contour shapes of the neighboring base stations intersect so as to define a first bounding polygon area that describes the relative position of the mobile unit;

determining which lobes of the neighboring base stations are in communication with the mobile unit;

determining the orientation ranges of the communicating lobes of the neighboring base stations in terms of azimuth angles so as to define a second bounding polygon area that describes the relative position of the mobile unit; and determining where the first and second bounding polygon areas intersect so as to define a location polygon that describes the position of the mobile unit in terms of minimum and maximum error estimate.

3. For use in a wireless communication system including a plurality of Spatial Division Multiple Access (SDMA)-equipped and non-SDMA-equipped base stations each having an antenna with a corresponding coverage area, a method for determining the position of a mobile unit, comprising:

for each of the non-SDMA-equipped base stations, providing a plurality of bandpass filters in electrical communication with the corresponding antenna, each of the band-pass filters having a corresponding waveguide and operative to receive mobile unit signals from predetermined directions in predetermined frequency slots;

for each of the base stations, determining in cooperation with a receiver, a plurality of RF measurements for the base station, for a predetermined plurality of distances and directions;

for each of the base stations, modeling its determined RF measurements as a scaled contour shape having minimum and maximum boundaries;

determining where the contour shapes of the neighboring base stations intersect so as to define a first bounding polygon area that describes the relative position of the mobile unit;

determining the communication frequencies of the neighboring base stations and the corresponding directions of their received mobile unit signals so as to define a second bounding polygon area that describes the relative position of the mobile unit; and determining where the first and second bounding polygon areas intersect so as to define a location polygon that describes the position of the mobile unit in terms of minimum and maximum error estimate.

* * * * *